United States Patent
Lynch

(10) Patent No.: US 9,047,688 B2
(45) Date of Patent: Jun. 2, 2015

(54) DEPTH CURSOR AND DEPTH MEASUREMENT IN IMAGES

(75) Inventor: James D. Lynch, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 841 days.

(21) Appl. No.: 13/278,512

(22) Filed: Oct. 21, 2011

(65) Prior Publication Data

US 2013/0100114 A1 Apr. 25, 2013

(51) Int. Cl.
| | |
|---|---|
| G09G 5/00 | (2006.01) |
| G09G 5/02 | (2006.01) |
| G09G 5/08 | (2006.01) |
| G06T 11/00 | (2006.01) |
| H04N 13/00 | (2006.01) |
| G06T 15/20 | (2011.01) |
| G01C 21/36 | (2006.01) |

(52) U.S. Cl.
CPC ............ *G06T 11/00* (2013.01); *H04N 13/0022* (2013.01); *G06T 15/205* (2013.01); *G01C 21/3638* (2013.01)

(58) Field of Classification Search
CPC ............ H04N 13/0022; H04N 13/026; H04N 2013/0081; H04N 13/0239; H04N 13/0271; H04N 13/0495; H04N 5/2226
USPC ................. 345/422, 629, 633, 158, 592, 157; 382/154, 103, 106
See application file for complete search history.

(56) References Cited

U.S. PATENT DOCUMENTS

| | | | |
|---|---|---|---|
| 6,374,182 B2 | 4/2002 | Bechtolsheim et al. | |
| 6,417,850 B1 * | 7/2002 | Kang ............................ | 345/422 |
| 6,507,665 B1 | 1/2003 | Cahill et al. | |
| 6,552,744 B2 | 4/2003 | Chen | |
| 6,999,620 B1 * | 2/2006 | Harville ........................ | 382/173 |
| 7,003,136 B1 * | 2/2006 | Harville ........................ | 382/103 |
| 7,460,953 B2 | 12/2008 | Herbst et al. | |
| 7,626,596 B2 | 12/2009 | Kotake et al. | |

(Continued)

FOREIGN PATENT DOCUMENTS

| | | |
|---|---|---|
| EP | 1584897 A2 | 10/2005 |
| EP | 2 309 463 | 4/2011 |

(Continued)

OTHER PUBLICATIONS

International Search Report and Written Opinion from PCT/EP2012/074881, Apr. 8, 2013.

(Continued)

*Primary Examiner* — Jeffrey Chow
(74) *Attorney, Agent, or Firm* — Lempia Summerfield Katz LLC

(57) ABSTRACT

One or more systems, devices, and/or methods for illustrating depth are disclosed. For example, a method includes receiving a depthmap generated from an optical distancing system. The depthmap includes depth data for each of a plurality of points, which are correlated to pixels of an image. Data indicative of a location on the image is received. Depth data correlated with the first point is compared to depth data correlated with pixels at surrounding points in the image. If the depth data correlated with the first point indicate a lesser distance from a viewer perspective of the image than the depth data of a pixel at the surrounding points in the image, the pixel is changed to a predetermined value. The comparison may be repeated at other pixels and a depth illustration may be drawn that relates the depth of the received location to other objects in the image.

19 Claims, 14 Drawing Sheets

(56) References Cited

U.S. PATENT DOCUMENTS

| | | | |
|---|---|---|---|
| 7,782,338 | B1 | 8/2010 | Zaklika et al. |
| 2004/0169724 | A1 | 9/2004 | Ekpar |
| 2006/0002590 | A1 | 1/2006 | Borak |
| 2006/0072848 | A1 | 4/2006 | Razzano |
| 2006/0184320 | A1 | 8/2006 | Hong |
| 2007/0233380 | A1 | 10/2007 | Tanaka |
| 2007/0237424 | A1 | 10/2007 | Burg et al. |
| 2009/0292457 | A1 | 11/2009 | Ford et al. |
| 2010/0023250 | A1 | 1/2010 | Mays et al. |
| 2010/0299065 | A1 | 11/2010 | Mays |
| 2010/0305854 | A1 | 12/2010 | Kammel et al. |
| 2011/0098918 | A1 | 4/2011 | Siliski et al. |
| 2011/0109617 | A1* | 5/2011 | Snook et al. ............... 345/419 |
| 2011/0109618 | A1 | 5/2011 | Nowak et al. |
| 2011/0141141 | A1 | 6/2011 | Kankainen |
| 2011/0216935 | A1 | 9/2011 | Mays et al. |
| 2011/0246055 | A1 | 10/2011 | Huck et al. |
| 2011/0279452 | A1 | 11/2011 | Ibe et al. |
| 2011/0283223 | A1 | 11/2011 | Vaittinen et al. |
| 2011/0289510 | A1* | 11/2011 | Lin et al. .................. 718/106 |
| 2011/0310091 | A2 | 12/2011 | Yoshida et al. |
| 2011/0313653 | A1 | 12/2011 | Lindner |
| 2012/0044476 | A1 | 2/2012 | Earhard et al. |
| 2012/0051631 | A1* | 3/2012 | Nguyen et al. ............ 382/164 |
| 2012/0114225 | A1* | 5/2012 | Lim et al. .................. 382/154 |
| 2012/0133639 | A1 | 5/2012 | Kopf et al. |
| 2013/0038689 | A1 | 2/2013 | McDowall |

FOREIGN PATENT DOCUMENTS

| | | |
|---|---|---|
| WO | WO2009131276 A1 | 10/2009 |
| WO | WO 2010/012310 | 2/2010 |
| WO | WO2010024212 | 3/2010 |

OTHER PUBLICATIONS

U.S. Appl. No. 13/278,499, unpublished, filed Oct. 21, 2011, Lynch.
U.S. Appl. No. 13/278,546, unpublished, filed Oct. 21, 2011, Lynch.
"Google Maps Navigation for mobile." http://www.google.com/mobile/navigation/. 2 pages (viewed on Oct. 19, 2011).
U.S. Appl. No. 13/332,718, Unpublished, filed Dec. 21, 2011, Lynch.
U.S. Appl. No. 13/340,923, Unpublished, filed Dec. 30, 2011, Lynch.
U.S. Appl. No. 13/341,152, Unpublished, filed Dec. 30, 2011, Lynch.
Ding, Ming et al., :Automatic registration of aerial imagery with untextured 3D LiDAR models, University of California Berkeley, 8 pages.
Inpainting, http://iat.ubalt.edu/summers/math/inpainting.htm (viewed on Nov. 30, 2011).
Kopf, Johannes et al., "Street Slide: Browsing Street Level Imagery," Microsoft Research, 8 pages.
International Search Report and Written Opinion cited in PCT/EP2012/069812 mailed on Mar. 6, 2013.
Kawakita et al., "Real-Time Three-Dimensional Video Image Composition by Depth Information", IEICE Electronics Press, vol. 1, No. 9, Aug. 10, 2004.
David Gallup et al., "Piecewise Planar and Non-planar Stereo for Urban Scene Reconstruction", Jun. 13, 2010, pp. 1418-1425, 2010 IEEE Conference on Computer Vision and Pattern Recognition.
International Search Report and Written Opinion, from related International Application No. PCT/EP2012/070438, Apr. 17, 2013.
International Search Report and Written Opinion, from related International Application No. PCT/EP2012/075022, Apr. 15, 2013.
Stephen Shankland, "Google Gathers 3D Data with Street View", May 15, 2008, retreived from the internet: URL: http://news.cnet.com/8301-10784_3-9945.
Anderson et al., Unwrapping and Visualizing Cuneiform Tablets, 2002, p. 82-88, vol. 22, Issue 6, IEEE Computer Graphics and Applications.
Hu et al., Integrating LiDAR, Aerial Image and Ground Images for Complete Urban Building Modeling, 2006, p. 184-191, 3D Data Processing, Visualization and Transmission.
Song et al., Assessing the Possibility of Land-Cover Classification using LiDAR Intensity Data, 2002, p. 259-262, International Archives of Photogrammetry.
Wei, Building Boundary Extraction Based on LiDAR Point Clouds Data, 2008, pp. 157-162, 37, Part B3b, International Archives of Phtotgrammetry Remote Sensing and Spatial Information Sciences.
Yu et al., Automated Derivation of Urban Building Density Information using Airborne LiDAR Data and Object-Based Method, 2010, p. 210-219, Elsevier, Landscape and Urban Planning 98.
Frueh et al., Data Processing Algorithms for Generating Textured 3D Building Facade Meshes from Laser Scans and Camera Images, 2005, p. 159-184, vol. 61, International Journal of Computer Vision.

\* cited by examiner

DEPTH CURSOR AND DEPTH MEASUREMENT IN IMAGES

REFERENCE TO RELATED APPLICATIONS

The present patent application is related to the patent applications filed on the same date, Ser. No. 13/278,499 (now U.S. Pat. No. 8,553,942), entitled "REIMAGING BASED ON DEPTHMAP INFORMATION," and Ser. No. 13/278,546, entitled "THREE DIMENSIONAL ROUTING,", the entire disclosures of which are incorporated by reference herein.

BACKGROUND OF THE INVENTION

The present invention relates to maps and/or navigation and, more particularly, to method(s) and system(s) for illustrating depth in images, such as panoramic, street level view, or high-altitude view images, in a map application or a navigation application.

Navigation applications may be installed in vehicles to provide images to passengers or in portable (e.g., handheld) devices such as phones, personal digital assistants, or personal navigation devices. The navigation application may provide images that aid the user in determining current position and guiding the user to a destination. In addition the images provide information such as points of interest to the user. Alternatively, map applications, which may be stationary or portable, provide users with similar services from a website or other service without regard to the current position of the user.

In some situations, the user may select an object or specific area of the images to choose a route or request additional information about the object or location. Because navigation or map systems typically involve a two-dimensional (2D) representation of a three-dimensional (3D) image, when an object is selected, distinction between whether the object is a foreground image or a background image is often difficult.

SUMMARY OF THE INVENTION

According to one aspect, one or more systems, devices, and/or methods for illustrating depth are disclosed. For example, a method includes receiving a depthmap generated from an optical distancing system. The depthmap includes depth data for each of a plurality of points, which are correlated to pixels of an image. Data indicative of a location on the image is received. Depth data correlated with the first point is compared to depth data correlated with pixels at surrounding points in the image. If the depth data correlated with the first point indicate a lesser distance from a viewer perspective of the image than the depth data of a pixel at the surrounding points in the image, the pixel is changed to a predetermined value. The comparison may be repeated at other pixels and a depth illustration may be drawn that relates the depth of the received location to other objects in the image. The depth illustration may be a cursor.

The present invention is defined by the following claims, and nothing in this section should be taken as a limitation on those claims. Further aspects and advantages of the invention are discussed below in conjunction with the preferred embodiments.

DETAILED DESCRIPTION OF THE PRESENTLY PREFERRED EMBODIMENTS

Figure 1:
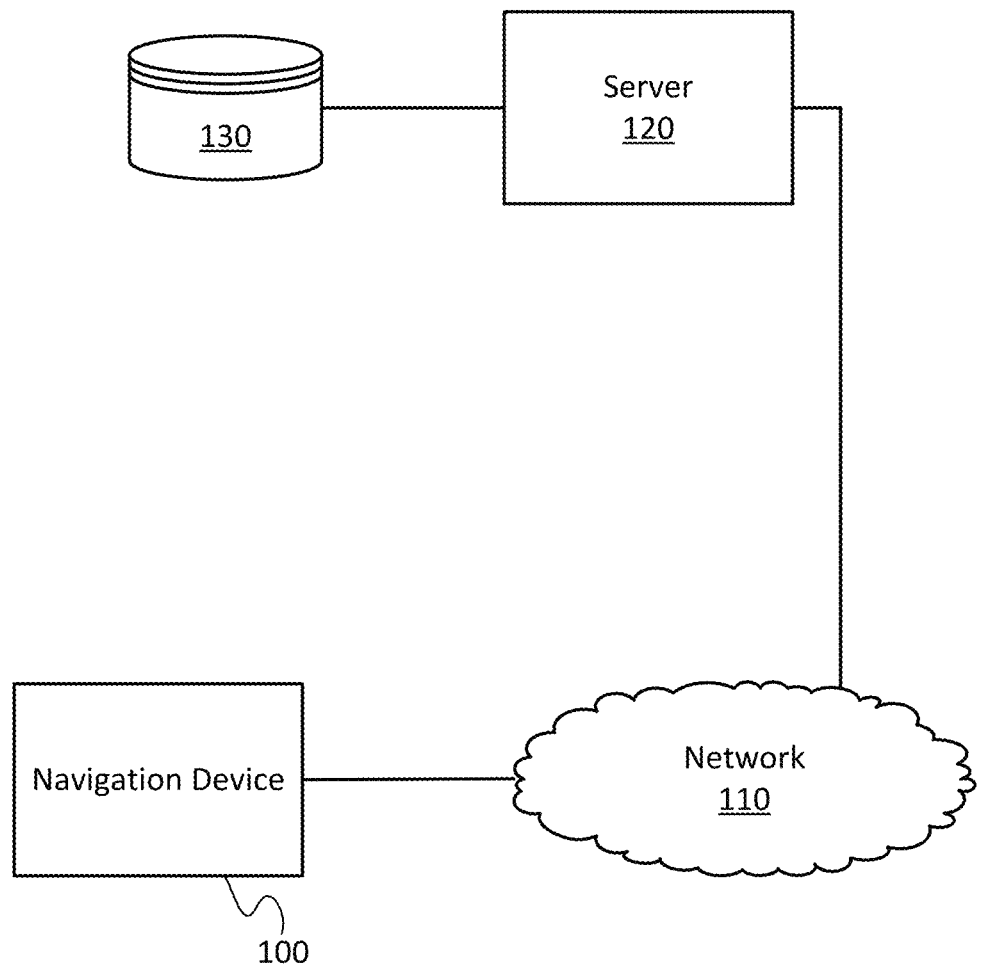
FIG. 1 illustrates an example embodiment of a navigation system or map system.

Map systems or navigation systems provide users with panoramic images, street level view images, or high-altitude images (e.g., satellite, airplane) for navigation related features or map related features. Navigation related features include determining an optimum route and providing directions (e.g., exit cues or turn cues) to travel along a path from an original location to a destination location. The path may be a road network, a pedestrian pathway network, or an indoor walkway network. Navigation related features may be provided by mobile devices. Map related features, or features without a navigational or guidance component, may be provided by mobile devices or stationary devices. Map related features include locating nearby points of interest or directions between two positions. Any of the embodiments described herein may be configured to provide navigation related features, map related features, or both.

Map related features or navigation related features may involve a computer generated depth illustration in images. The depth illustration is a visual cue or feedback to the user regarding the depth of various objects. The images are photographs, collected images, or any images not entirely generated by machine. To the extent these images are utilized in map related features or navigation related features, these images may be referred to as panoramic images or street level images. The depth illustration may be a depth cursor drawn as a plane or a 3D object drawn in the image. The depth illustration may be a computer generated measurement illustration that emphasizes the differences in depth between real world objects in the image. The plane or 3D object drawn in the image appears in front of one or more objects in the image and/or behind one or more objects in the image. The measurement illustration may be a line from one point in the image to another point in the image drawn behind or in front of the real world objects in the image.

The depth illustration may distinguish the depth of a user selected location in the image or an automatically selected location in the image. User selected locations are picked by user through touching, clicking, or hovering (e.g., mousing) above the image. Automatically select locations in the image are selected automatically by the navigation application or the map navigation in order to illustrate a route or a point of interest.

In another implementation, a computer system (e.g., map system or navigation system) may automatically select objects in an image. The computer system may automatically detect specific objects in the image through image processing. As an example, the specific objects may be doorways. The depth illustration may be a shape, icon, or highlighting drawn on the image just behind or in intersection with the detected location of the doorway. A user may then audit or check the detected location of the doorways by observing the depth location and approving or disapproving the detection of the specific object in order to update a map database. As another example, the specific objects may be fire hydrants, road signs, etc.

In a 2D image, the map or navigation system may indicate the exact location to the user. However, the user may not be able to distinguish between the object that was desired to be selected or indicated and another object nearby in the 2D image. Often, the objects are substantially apart geographically but appear very close in the 2D representation. Other methods that distinguish between objects in 2D images may be possible, but utilize image processing techniques such as edge detection, feature extraction, and complex filters that require high processing resources.

Depthmaps (depth maps) may be constructed from light detection and ranging (LIDAR) data. LIDAR, which may also be referred to as three-dimensional laser scanning or an optical distancing system, employs one or more lasers or "cameras" to collect data points representing an area, such as an area about a road or walkway. Software generates the depthmap based on the measured distance, the locations of the optical distancing system, which may be on a moving platform such as a car, and the angle of the laser. Other optical distancing systems include a stereoscopic camera, a time of flight infrared camera, and a structured light device. A LIDAR device collects and gathers data points in a point cloud in which each data point corresponds to a local coordinate, such as (x, y, z), and is either on or off. Alternatively, the LIDAR data may be a grayscale point cloud including an intensity (indicating reflectivity) for each data point, in a predetermined range of values (e.g., 0 to 255, 0 to 65536) with black at one end of the range and white at the other. The point cloud may be stored in ASCII or LIDAR exchange format (e.g., the American Society for Photogrammetry and Remote Sensing (ASPRS) .LAS file format). The one or more lasers may be in a near infrared spectrum (such as about 700 nm to about 5000 nm or about 800 nm to about 2500 nm) or other light spectrum.

FIG. 1 illustrates a system 150 for illustrating depth in an image. The system 150 includes a user device 100 (e.g., map device, navigation device), a network 110, a server 120, and a database 130. The database 130 may be maintained by a map developer, such as NAVTEQ North America, LLC located in Chicago, Ill. The map developer may collect geographic data to generate and enhance the database 130. The user device 100 may be a cellular telephone (smart phone), a personal digital assistant ("PDA"), a tablet computer, a laptop, a personal navigation device ("PND"), an in-vehicle navigation system, a personal computer or another computing device.

The system 150 for illustrating depth in an image receives a depthmap generated from an optical distancing system. The depthmap includes depth data for each of a plurality of points. The optical distancing system may be a LIDAR device, a stereoscopic camera, or a structured light device. The depthmap is generated from the collected optical distance data. The depthmap may be created using any arbitrary viewpoint or perspective. The optical distance data is 3D data and is easily manipulated to any viewpoint or perspective, which is in contrast to a 2D image which is valid from a fixed viewpoint. Depthmaps may be generated for each panoramic image viewpoint and stored in the database 130. The depthmap includes position data (X-Y coordinates) and depth data (Z coordinate) for each of plurality of points. The depth information provides each pixel with a 3D location that combined with the stored image geo-position and orientation provides the real-world position of each pixel as a 3D value. The 3D value is compared to other real-world 2D and 3D spatial map data, points, regions, paths, volumes, etc. to enhance the original 2D camera image based on real-world 3D objects rather than simple alterations in 'flat' 2D screen space.

The system 150 correlates the plurality of points in the depthmap to pixels of the image. For example, the image may be pixilated raster data in a bitmap, JPEG, GIF, and/or other image format. The correlation may be an overlay of the depthmap on an image according to the position data. Assuming the optical distance data and the panoramic image were collected from the same perspective and/or location, the overlay may involve combining the depth data with the image data of the panoramic image. If the depthmap and the panoramic image were collected from different angles and/or positions, additional geometric calculations are necessary to properly align the depthmap and the panoramic image. The associations between the pixels of the panoramic image and the depth map values may be stored in database 130. In other words, the depthmap and the panoramic image may be pre-aligned and the overlaid or combined data is stored in the database 130.

The system 150 receives a data point indicative of a location on the image. The data point may be indicative of a location on the image selected by the user, or the data may be an automatically selected location on the image by a navigation or map application. The data may indicate a destination, a point of interest, a turn cue, a street, an address, a route, a sign, a building, etc.

The system 150 draws a depth illustration at the depth of the data point. The system 150 may identify a plurality of surrounding points to define the size of the depth illustration. The plurality of surrounding points are adjacent to the data point in the image or within a predetermined distance to the data point in the image. The predetermined distance may be measured in pixels. Alternatively, the predetermined distance may depend on the depth of the data point such that the depth illustration is larger as the data point is closer to the foreground of the image and smaller as the data point is closer to the background of the image.

The system 150 compares the depth of the data point depths correlated with one or more of the plurality of surrounding points. For each of the surrounding points that have depth values that indicate more depth than the selected point, the depth illustration is drawn in the image. For each of the surrounding points that have depth values that indicate less depth than the selected point, the image pixels are not changed.

For example, a first depth datum is correlated with the selected data point. The first depth datum is a point on the depthmap, which may be selected by picking a point on the panoramic image or otherwise specifying a 3D location. If the first depth datum indicates a lesser distance from a perspective of the image than a second depth datum of a surrounding point, the system 150 changes or re-colors the pixel to a predetermined value which contrasts to the original value of the image at the pixel. If the first depth datum indicates a greater distance from the perspective of the image than the second depth datum, the system 150 does not adjust the pixel. That is, the pixel of the image remains at the original value. The comparison may be repeated for each or a subset of the plurality of surrounding points in order to draw the depth illustration. The depth illustration appears in front of objects behind the selected location in the image and behind objects in front of the selected location in the image. The objects in the image may include points of interest such as buildings, addresses, location names, store fronts, geographical features, signs, or any physical object.

The depth illustration allows a user to distinguish between the object that was desired to be selected or indicated and another object nearby in the 2D image. For example, the intended object may be distinguished from the ground or other background that is associated with a substantially greater depth in the image. Other problems that may be avoided by the depth illustration include the unintended selection because an object has "holes" (e.g., open spaces between leaves on a tree or transparent objects such as windows in a building) or an unintended selection because the depthmap and the image are not properly aligned (e.g., misregistration), or missing points or gaps in the depthmap. Gaps in the depthmap may be caused randomly in data collection or caused when the optical distancing system does not reach a far off object (e.g., the sun, a distant building skyline).

The computing resources necessary for illustrating depth in an image may be divided by the server 120 and the user device 100. In some embodiments, the server 120 performs a majority of the processing ("server-based embodiments"). The database 130 stores a depthmap generated from an optical distancing system, and the server 120 receives the depthmap from the database 130. The server 120 overlays the depthmap on an image according to the position data. The server 120 receives data indicative of a selection in the image on the user device 100. The server 120 compares depth data associated with the selection to depth values of surrounding pixels. For each of the surrounding pixels that are closer to the viewer, the surrounding pixel remains in the image. For each of the surrounding pixels that are farther from the viewer than the selection, the surrounding pixel is replaced with a predetermined value. The server 120 transmits the image including the depth illustration to the user device 100.

In other embodiments, the user device 100 performs a majority of the processing ("user device-based embodiments"). The user device 100 receives a depthmap from the server 120. Alternatively, the user device 100 may receive the combined depthmap and image from the server 120. The image is displayed to a user. The user may have selected an object on the image or the user device 100 may have selected the object according to a route or a point of interest. The user device 100 compares depth data of the selection to depth data of surrounding points. A depth illustration is drawn by replacing individual pixels in the image. Pixels associated with depth values closer to the perspective of the image are left unchanged and pixels associated with depth values farther from the perspective of the image are changed to a predetermined value.

In a hybrid embodiment, the processing is divided between the server 120 and the user device 100. In one example, the server overlays the depthmap on the panoramic image and sends the combined depthmap and panoramic image to the user device 100, and the user device 100 adds the graphical effect. The overlaid depthmap and panoramic image may be pre-aligned and stored in the database 130. Alternatively, a section or sub-region of the panoramic image overlaid with the depthmap may be delivered in order to reduce network bandwidth requirements. The section or sub-region may be the area surrounding the cursor. The section or sub-region may be defined by a radius proportional to the cursor size. In another embodiment, the server may send a low resolution depth map initially and send a higher resolution depth map after a predetermined time period.

For navigation related applications, the user device 100 may generate a location according to the geographic location of the user device 100. The location may be generated using positioning circuitry including one or more of a global navigation satellite system based on a satellite signal, a triangulation system that utilizes one or more terrestrial communication signals, a inertial position system based on sensors such as gyroscopes or accelerometers, and/or a or dead reckoning system based on a previously known position. The positioning circuitry may also determine an orientation using any of the above systems and/or a magnetic sensor such as a compass. The orientation and the location allow the appropriate depthmap and panoramic image to be selected based on the perspective of the user at the current geographic location of the user device 100.

The network 110 may include any combination of a cellular network, the Internet, or a local computer network. For example, the user device 100 may communicate with the network 110 wirelessly though protocols known as Wi-Fi, the protocols defined by the IEEE 802.11 standards, the protocols defined by the Bluetooth standards, or other protocols. Alternatively or in addition, the user device 100 may communicate with the network 110 wirelessly as a cellular network such as a Global System for Mobile Communication (GSM) or other third generation (3G) or fourth generation (4G) networks.

Figure 2A:
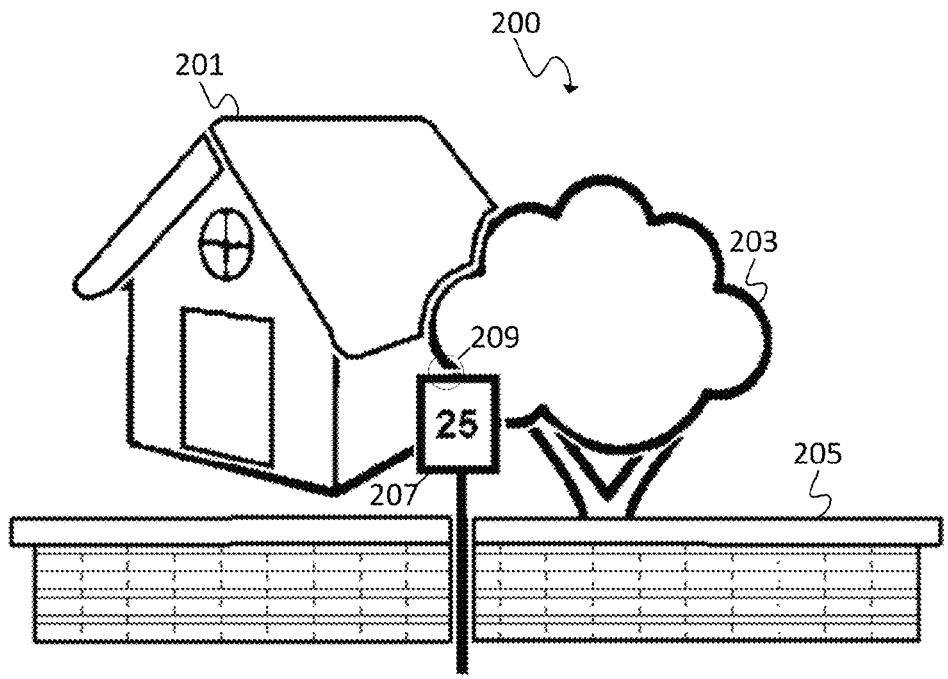
FIG. 2A illustrates an image for use with the navigation system or map system of FIG. 1.

FIG. 2A illustrates an image 200 for use with a navigation system or a map system. The image 200 may depict outdoor environments, as shown, indoor environments (e.g., shopping mall, convention center, etc.) or hybrid outdoor and indoor environments (e.g., fairgrounds, amusement park, etc.). Alternatively, the image 200 may be displayed in an augmented reality system. In the augmented reality system, the image 200 is received in real time by a camera on the user device 100. The image 200 may be a panoramic image, a street level view image, or a satellite view image. The image 200 includes objects at a plurality of depths. In the example shown in FIG. 2A, four depths are shown. A sign 207 is nearest to the viewer, which is followed by a wall 205, and a tree 203. A house 201 is the farthest from the view. A hypothetical user selection 209 is in an area in the image 200 that is very near the house 201, the tree 203, and the sign 207 in the image 200 even though in the physical world, these objects are relatively far apart.

Figure 2B:
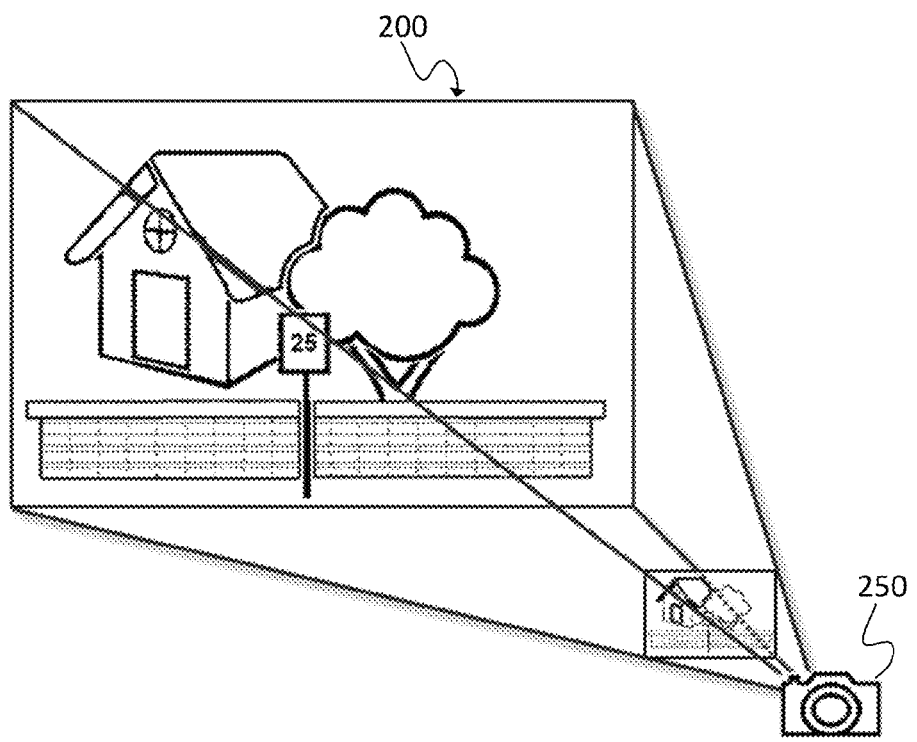
FIG. 2B illustrates a predetermined camera angle that the image was collected.

FIG. 2B illustrates a specific camera angle that the image 200 was collected by a camera 250. The specific camera angle may have one, two, or three components (e.g., roll, pitch, yaw) measured from any of three coordinate axes. The specific camera angle may be used to align the depth data to the panoramic image. The image 200 may be a planar image additionally defined by a field of view. Alternatively, the camera 250 may be an unknown position and/or orientation at the time the image 200 was collected. Feature matching may match features in the image 200 to known images in the database 130 in order to determine the position or orientation of the image. The camera 250 may be included in the user device 100.

Figure 3A:
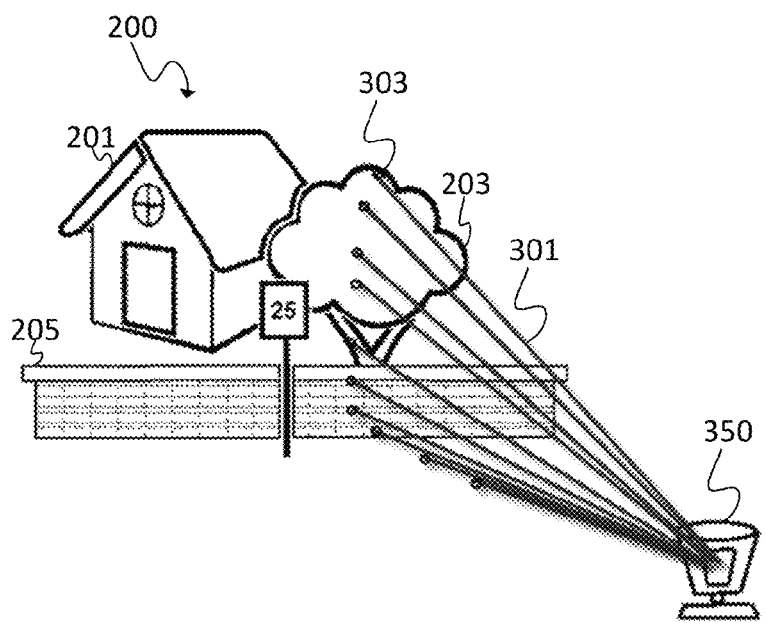
FIG. 3A illustrates the collection of optical distance data using the optical distancing system.

FIG. 3A illustrates the generation of optical distance data using the optical distancing system 350. The optical distancing system 350 may be a LIDAR device, a stereoscopic camera, a time of flight camera, a structured light device, or another device. In the example of a LIDAR device, one or more (e.g., 1, 2, 10) lasers rotate about an axis. The optical distancing system 350 may be coupled with an inertial measurement unit (IMU) and/or an inertial navigation system (INS) in order to provide a geographic reference to the optical distance data. FIG. 3A illustrates one such plane including laser paths 301 and depth points 303. The optical distance system 350 measures the distance from the optical distancing system 350 to the various objects. In another example, the structured light device emits light onto objects and a camera captures images the structured light to determine distance based on the shape of the light in the captured images. The structured light may be infrared light or another light spectrum not visible to humans.

Figure 3B:
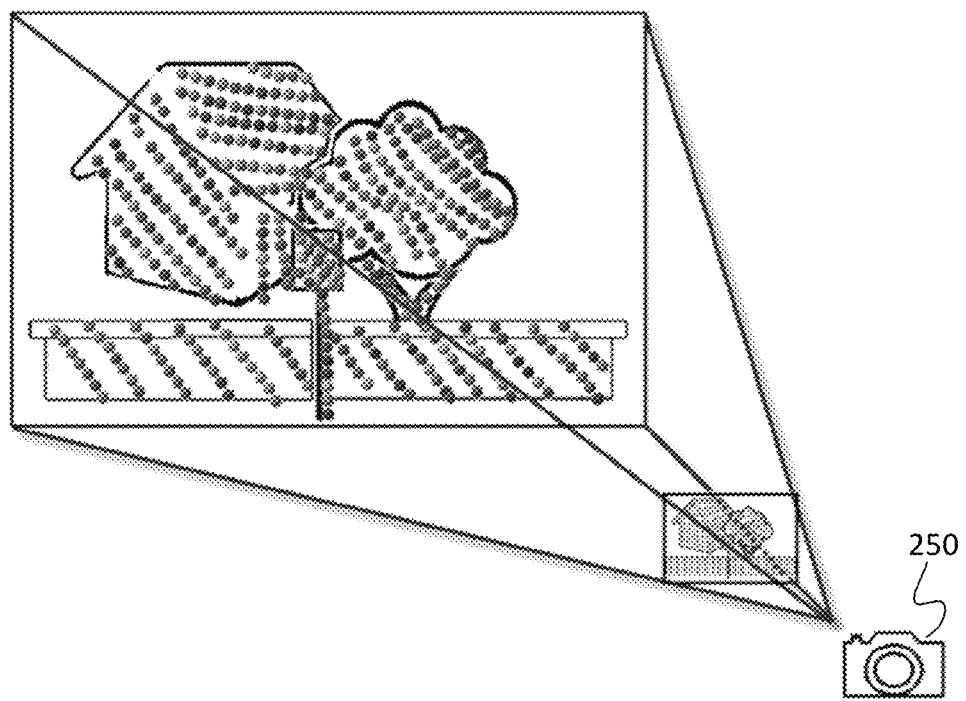
FIG. 3B illustrates alignment of the depthmap data.

FIG. 3B illustrates the depthmap data aligned with camera 250 at the angle of FIG. 2B. It should be noted that the optical distancing data may be received from any angle. However, at other angles, the optical distancing data may be manipulated to form depthmap data. The collected optical distance data may be true 3D data points. Because of the 3D nature of the points (as opposed to 2D image pixels), the data may be viewed from any angle. Therefore, a 'virtual' camera viewpoint of the 3D data may be simulated. In contrast, the camera capture of the image 200 is fixed based on the 2D image data and a camera view direction and position and camera parameters (e.g. field of view). For example, the virtual camera viewpoint is simulated by creating a view of the 3D data from the same viewpoint as that of the 2D color image by projecting the 3D points onto the camera viewplane. The distance of the 3D point from the camera is saved to generate a depthmap image such that each RGB color pixel of the original image has a direct mapping to a value in the depthmap that represents the distance of the pixel from the camera. The optical distance data, which may be referred to as 3D scan data, is correlated with the collected image (e.g., panoramic image, street level image).

Figure 4A:
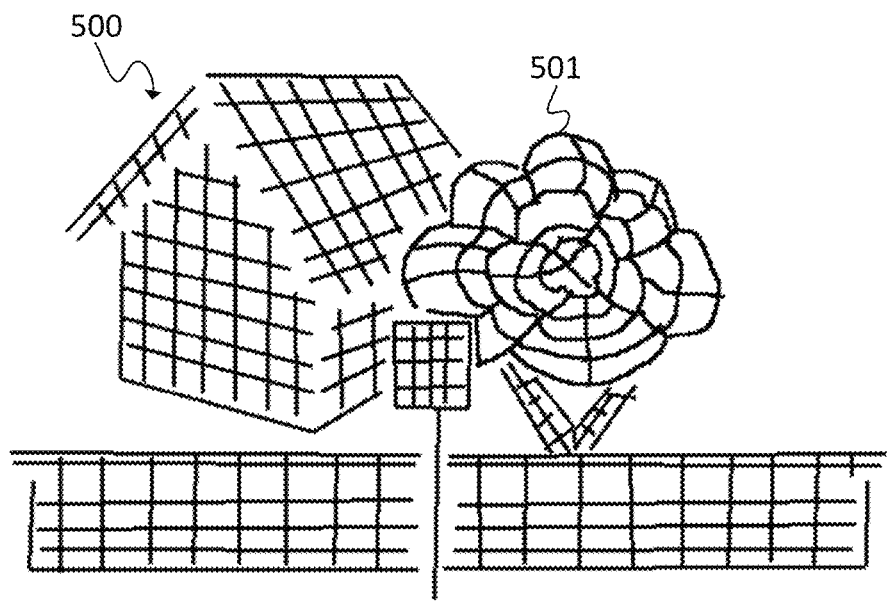
FIGS. 4A and 4B illustrate two example depthmap grids.
Figure 4B:
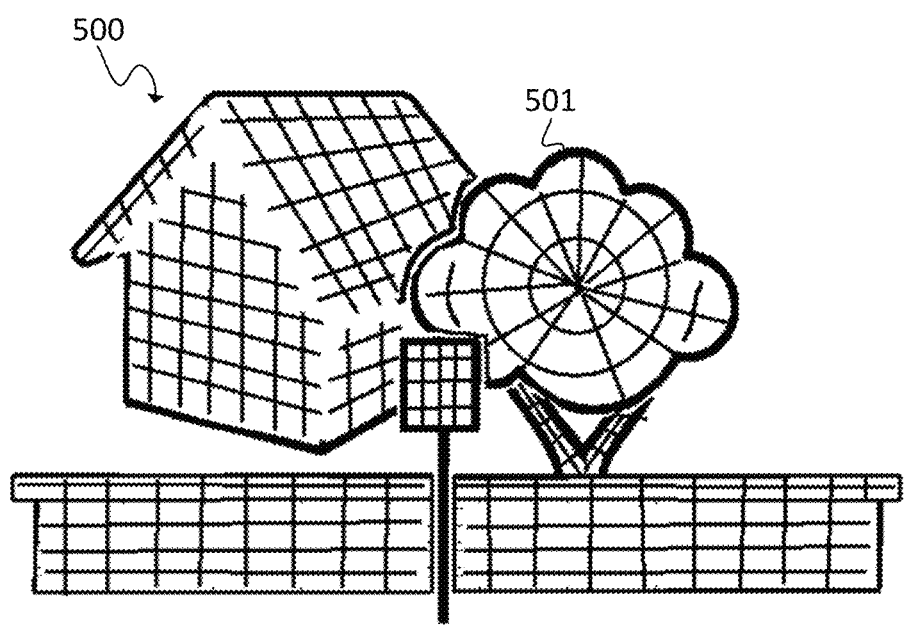

FIGS. 4A and 4B illustrate two example depthmap grids 500. Each cell 501 in the depthmap grid 500 spans multiple pixel locations. The depth data is displayed as a grid for demonstration purposes. However, each pixel may specify a unique depth value determined from the 3D sensor data points. Likewise, depth figures may be demonstrated by discrete depth values while in reality, these values may include a nearly continuous range of depth distances.

Generally, a depthmap is described as an image containing pixels that store depth values rather than RGB (red, green, blue) values. However, there are alternative mechanisms for storing and retrieving depth information. One mechanism for associating an image pixel with a depth value includes storing raw 3D points. An alternative mechanism includes pre-generating depth values for each image pixel and storing the depthmap as an image alongside the original color image. Another alternative mechanism includes converting the depthmap image pixels to a vector, polygon, or mesh based mapping to save memory space. The image may be converted to one of these vector/polygon/mesh representations by detecting approximate edges and gradients in the depth image. This storage model may be more efficient for storage and delivery due to smaller memory requirements. FIGS. 4A and 4B illustrate a mesh type depth map storage model.

Figure 5A:
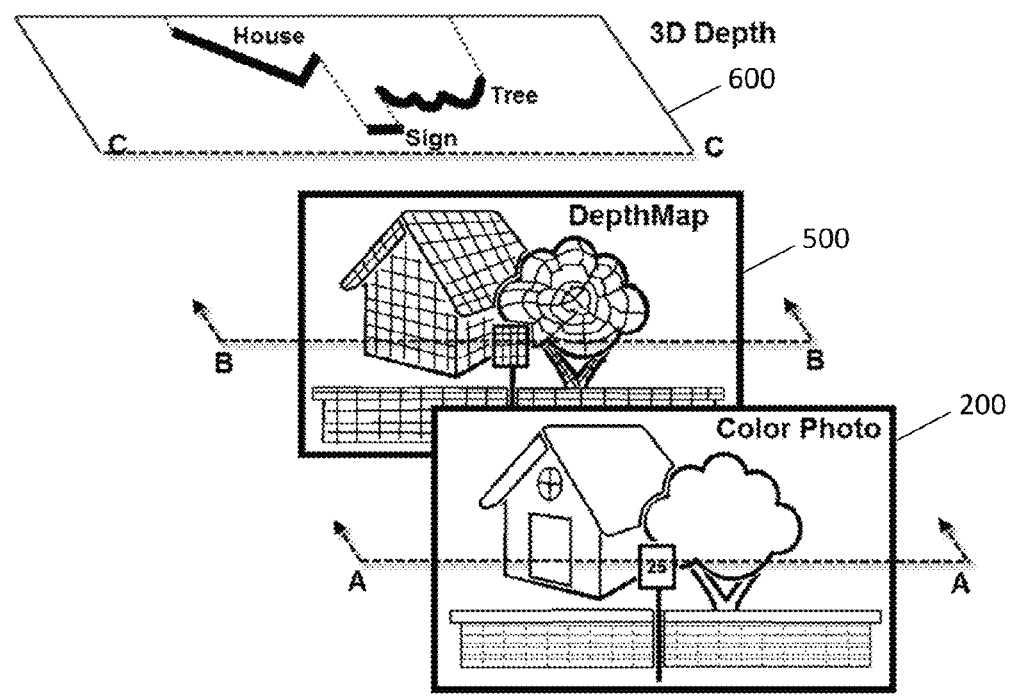
FIGS. 5A and 5B illustrate the determination of depth values.
Figure 5B:
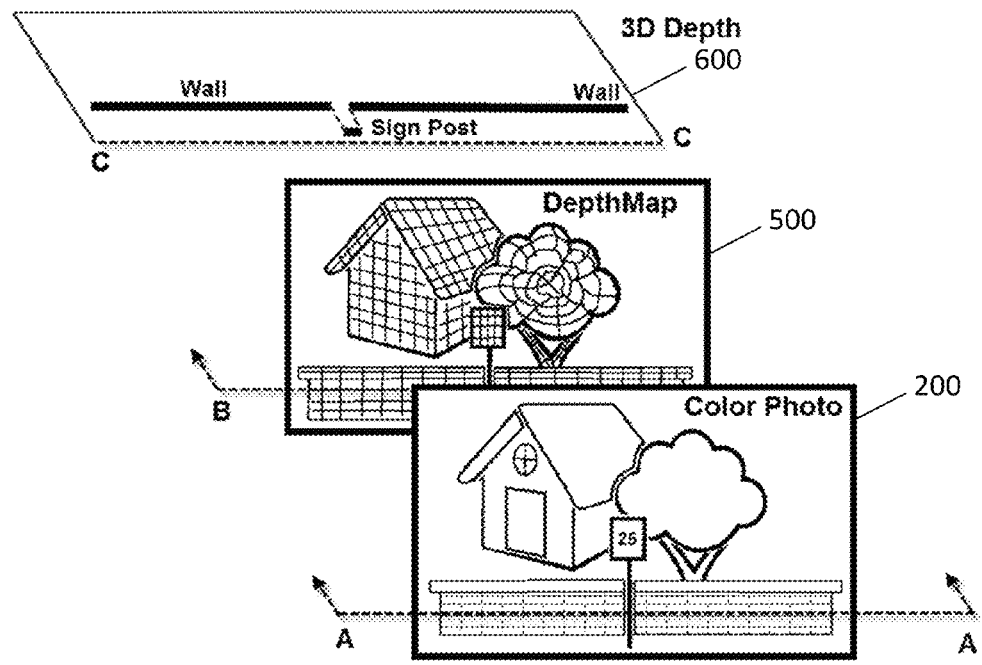

FIGS. 5A and 5B illustrate the calculation of image mapped depth values from a pre-generated depthmap. FIG. 5A illustrates a first cross section A-A of the image 200, which corresponds to a second cross section B-B in the depthmap grid 500. The C-C cross section plane or top down view 600 in FIG. 5A shows the depth values are defined to correspond to the sign 207, house 201, and tree 203. The depth map cross section C-C indicates that the house 201 is the furthest from the camera while the sign 207 is the closest. FIG. 5B illustrates a first cross section A-A of the image 200, which corresponds to a second cross section B-B in the depthmap grid 500. The C-C cross section plane or top down view 600 in FIG. 5B shows the depth values are defined to correspond to the sign 207 and the wall 205.

Figure 6:
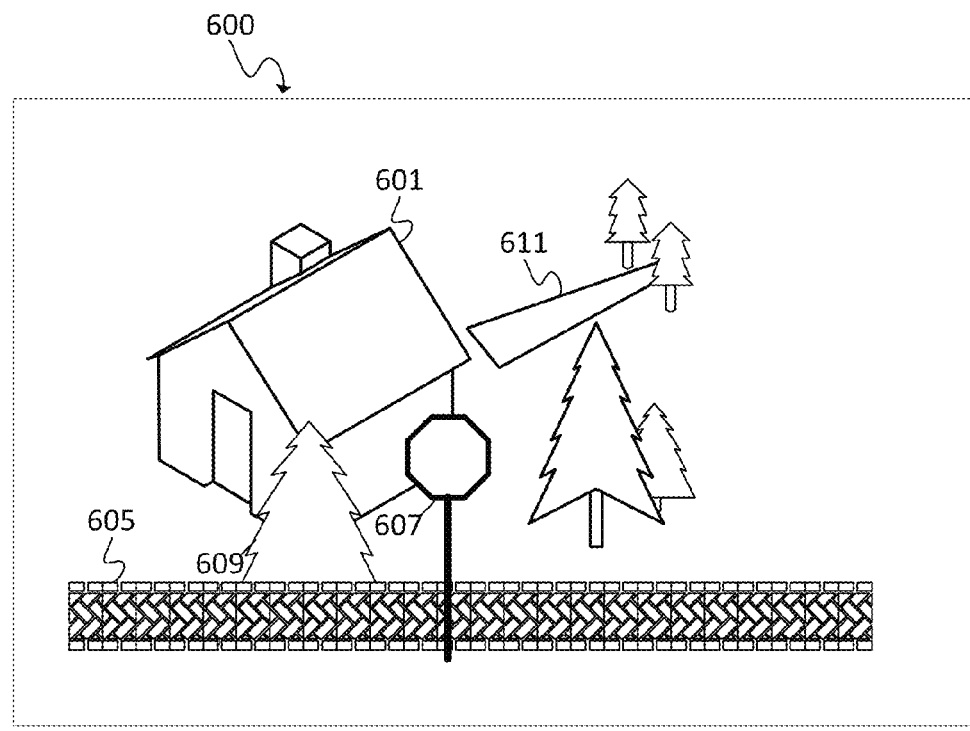
FIG. 6 illustrates another image for use with a navigation system or a map system of FIG. 1.

FIG. 6 illustrates another image 600 for use with a navigation system or a map system. The image 600 includes a plurality of objects such as a house 601, a wall 605, a tree 609, a sign 607, and a road 611. Based on their respective sizes, the objects appear at various distances from the perspective of the viewer. The distances are interpreted by the human brain based on past experience and knowledge about the sizes of objects to perceive the relative depths of the objects in the image 600. Computers do not have such experience and knowledge and cannot judge the relative depth. However, depthmaps enable the relative depth to be shown using depth illustrations.

Figure 7:
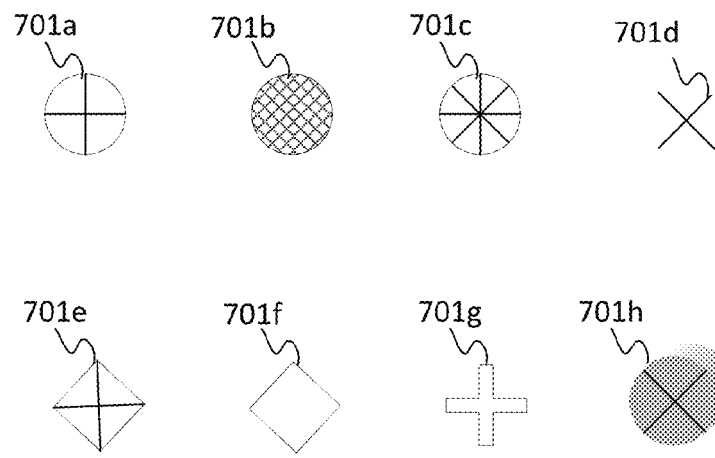
FIG. 7 illustrates example depth cursors.

FIG. 7 illustrates example depth illustrations as depth cursors 701*a-h*. The depth cursor may be drawn in a plane that corresponds to the depth data associated with the selection in the image 600. The depth cursor may be 2D or 3D. A 2D depth cursor may be any shape such as a circle, as shown by depth cursors 701*a-c*, a square or diamond, as shown by depth cursors 701*e-f*, or a cross, as shown by depth cursor 701*g*. The 2D depth cursor may include comprises an indicium to indicate the location, such as cross-hairs, as shown by depth cursors 701*a, c*, and *e*. The 2D depth cursor may comprise only cross-hairs, as shown by depth cursors 701*d* and *g*. The 2D depth cursor may be shaded or textured as shown by the cross hatchings in depth cursor 701*b*. The depth cursor may be drawn by the user device 100 in front of or behind the selection in the image 600 to illustrate the depth of the selection. A 3D depth cursor may be a disk, as shown by depth cursor 701*d*, a sphere, a cube, or another 3D shape. The shape, size, and cross-hairs may be configured by the user or by the server 120.

Figure 8:
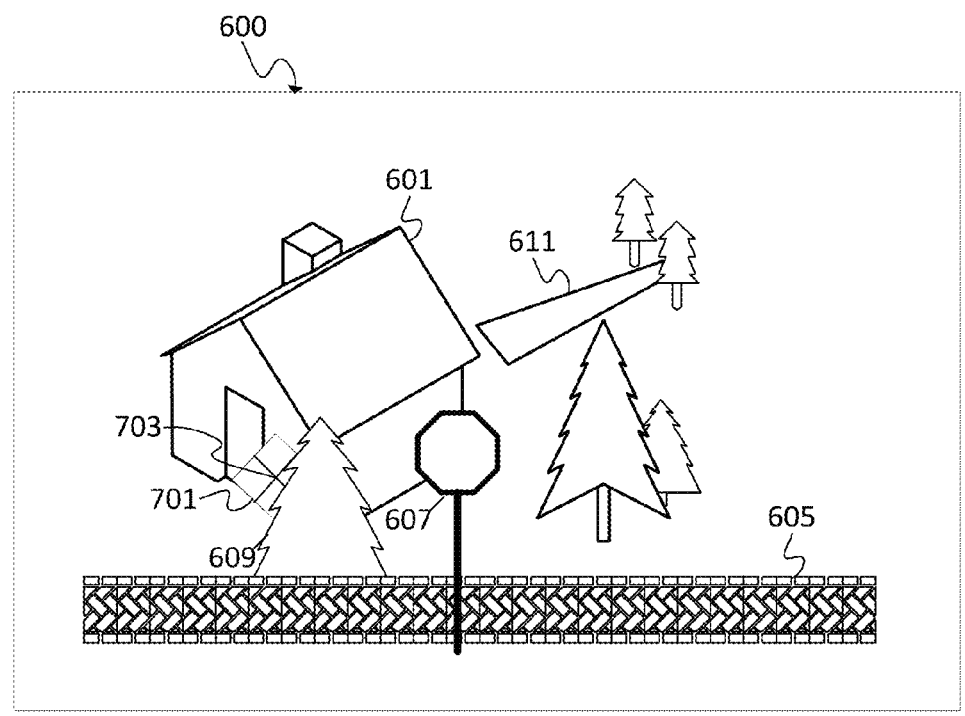
FIG. 8 illustrates a depth cursor drawn in the image of FIG. 6.

FIG. 8 illustrates a depth cursor 701 drawn in image 600. The depth cursor 701 may indicate selection of an object in front of the depth cursor 701, such as tree 609, or behind the depth cursor 701, such as house 601. In the example, shown in FIG. 8, the depth cursor indicates selection of the house 601. The center 703 of the depth cursor is drawn above the house 601. In order to draw the depth cursor, either the user device 100 or server 120 compares the depth data associated with the selection with depth data associated with a plurality of points surrounding the selection. At pixels where the depth data of the selection indicates a depth farther into the background of the image than the depth data associated with the pixel of the image, the pixels are not changed. At pixels where the depth data of the pixel indicates a depth nears to the foreground of the image than the depth data associated with the selection, the pixels are changed to values associated with the depth illustration. The depth data into the image may be measured with increasing values or decreasing values, either of which may be positive or negative.

Figure 9:
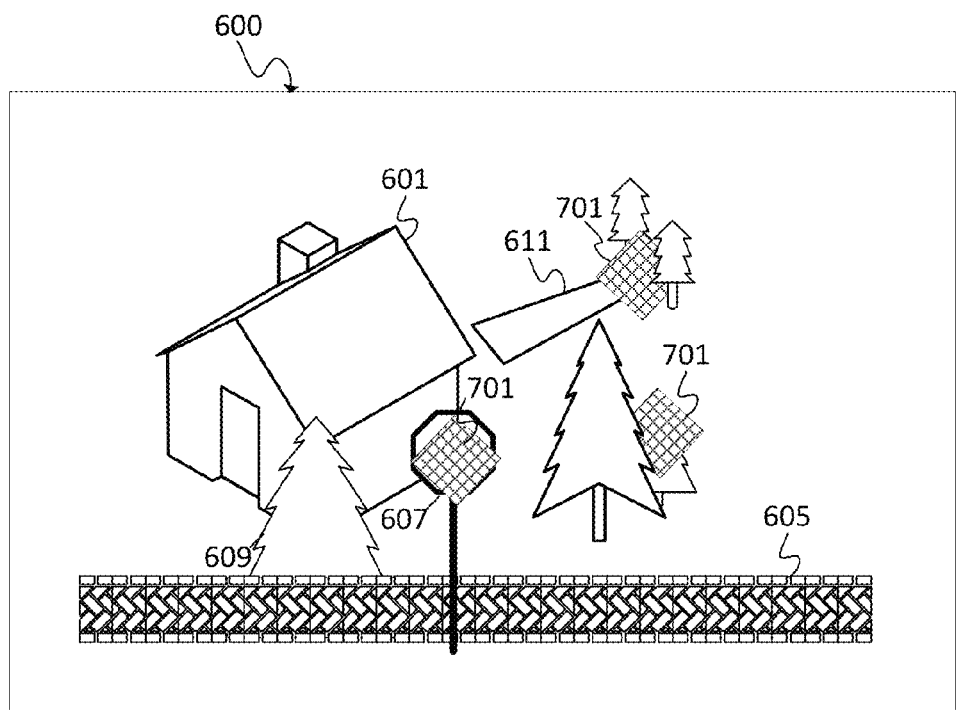
FIG. 9 illustrates another depth cursor drawn in the image of FIG. 6.

FIG. 9 illustrates another depth cursor 701 drawn in the image 600. The user is able to move the depth cursor 701 actively through the image 600. FIG. 9 illustrates three locations of the depth cursor 701 at different depths. The various locations of the depth cursor 701 are shown one at a time as the depth cursor 701 is moved in the image 600. The movement may be controlled similarly to a mouse pointer or arrow-shape cursor found on personal computers. The depth cursor 701 is drawn to appear above the object in the image 600 that coincides with the center of the depth cursor. The displayed location of the depth cursor 701 may updated continuously, which may be every predetermined time period (e.g., 1 second, 10 milliseconds, 1 millisecond), or updated based on a user input (e.g., each time the user clicks a mouse). The depth cursor 701 may be snapped to fit specific values such as the grids shown in FIGS. 4A and 4B. The user may finely tune the elected location of the depth cursor 701 using a zoomed scale (e.g., pixel by pixel movement).

When the depth illustration is a 3D depth illustration (e.g., a shape with a depth) the objects in the image may be shown to intersect with the depth illustration to give accurate depth comparison to the user. The 3D depth illustration may "cut through" object in the image, which illustrates the intersection between depthmap and depth illustration. For example, in the example of a 3D depth illustration as a sphere interacting with a tree in the image, when some of the leaves are visible, illustrates that the 3D depth illustration and the tree are overlapping (selected). In order to draw the 3D depth illustration, the user device 100 or the server 120 may compare the depth data of the image with a geometric function. For example, the geometric function may vary with the cosine function to compare the depth data of the image with the surface of the sphere.

Figure 10A:
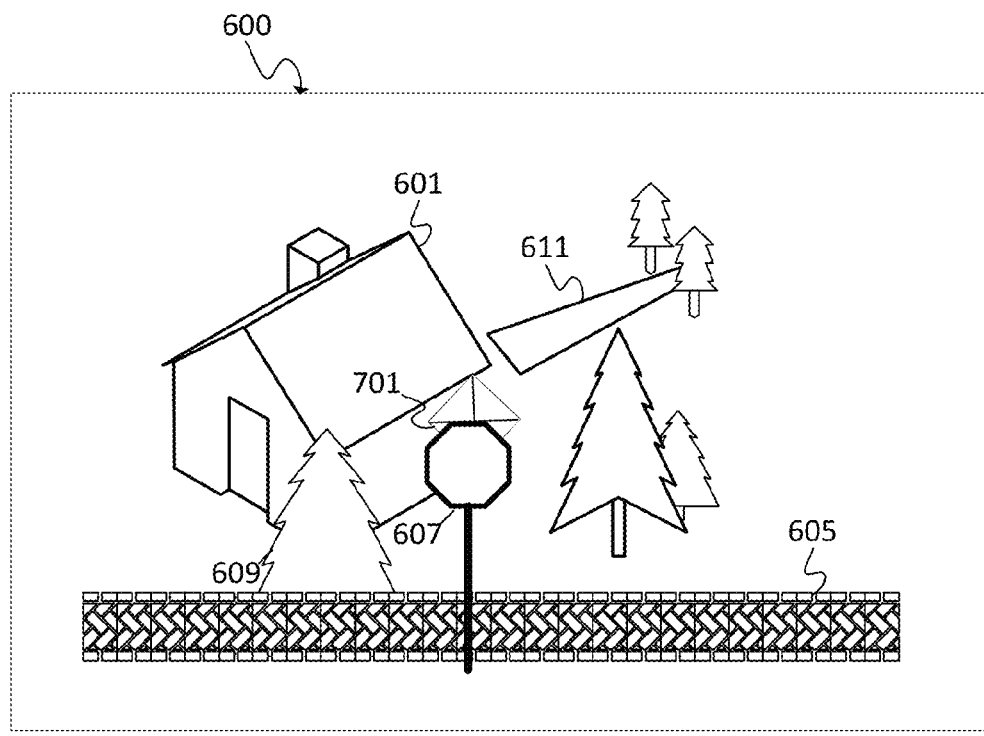
FIGS. 10A, 10B, and 10C illustrate adjacent placements of a depth cursor.
Figure 10B:
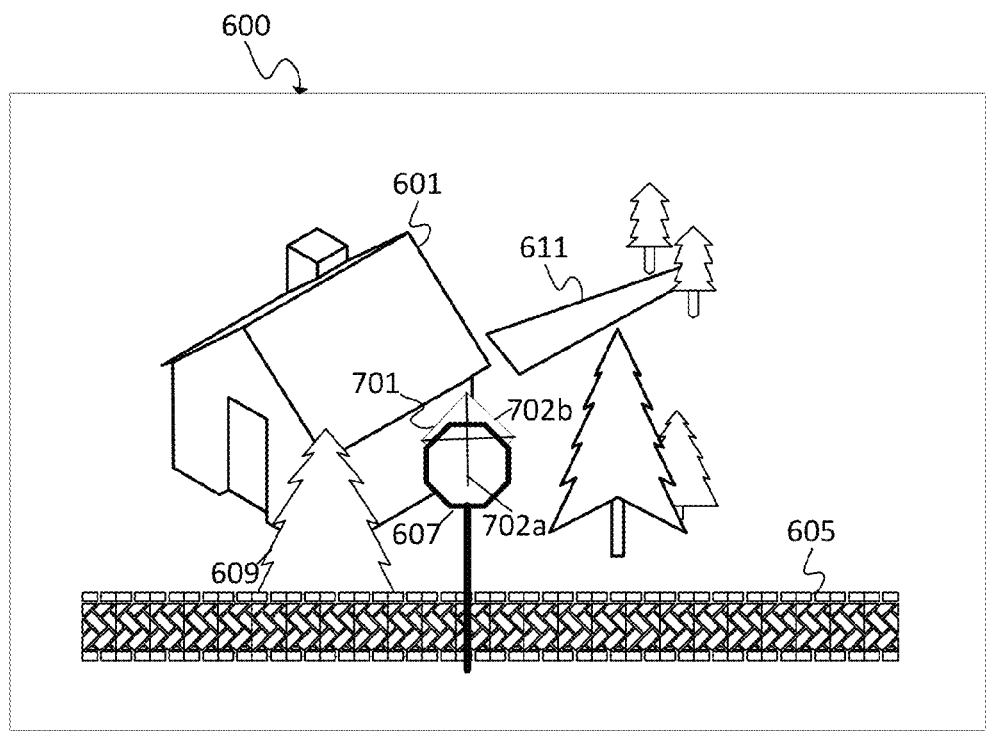
Figure 10C:
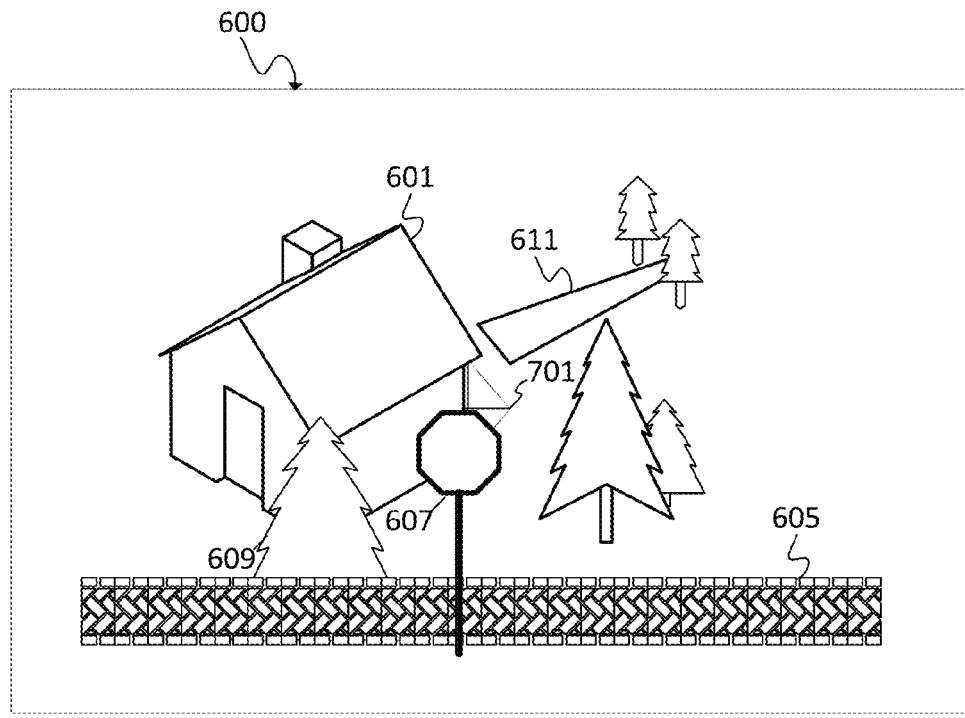

FIGS. 10A, 10B, and 10C illustrate adjacent placements of a depth cursor 701. The depth cursor 701 in FIG. 10A illustrates the selection of the house 601. The depth cursor 701 in FIG. 10B illustrates the selection of the sign 607. The depth cursor 701 in FIG. 10C illustrates the selection of the ground adjacent to the house 601. The difference in 2D positions of the depth cursors 701 in the image 600 may be relatively small but the difference in depth correlated with the respective locations in the image may be relatively larger. In other words, the depth cursor 701 illustrates substantial changes in depth between selections in the image that are relatively close together.

In addition, FIG. 10B illustrates a mixed visibility cursor. The mixed visibility cursor includes a backdrop 702b and a cross hair 702a. The backdrop 702b moves behind the selected object and the cross hair 702a moves in front of the selected object. The cross hair 702a may already appear on the top of the image, while the depth of the backdrop 702b depends on the selected depth. The difference in depth between the back drop 702b and the cross hair 702a may be a specified depth or calculated from the depth values.

Other 3D shapes are possible for the depth cursor. Layered 3D shapes help illustrated the selected depth. For example, the depth cursor may be a layered sphere where each layer is shown by a different color or shade. As the 3D shape intersects the varying depth map values in the image, the exposed color indicates depth of objects in the image. In another 3D implementation, the transparency of the depth cursor is determined by the distance between the depthmap and the front of the 3D shape. The image is more obscured as the camera viewpoint has to travel through more material of the depth cursor (e.g., a center of a sphere cursor is more opaque because there is more material to pass through).

Figure 11:
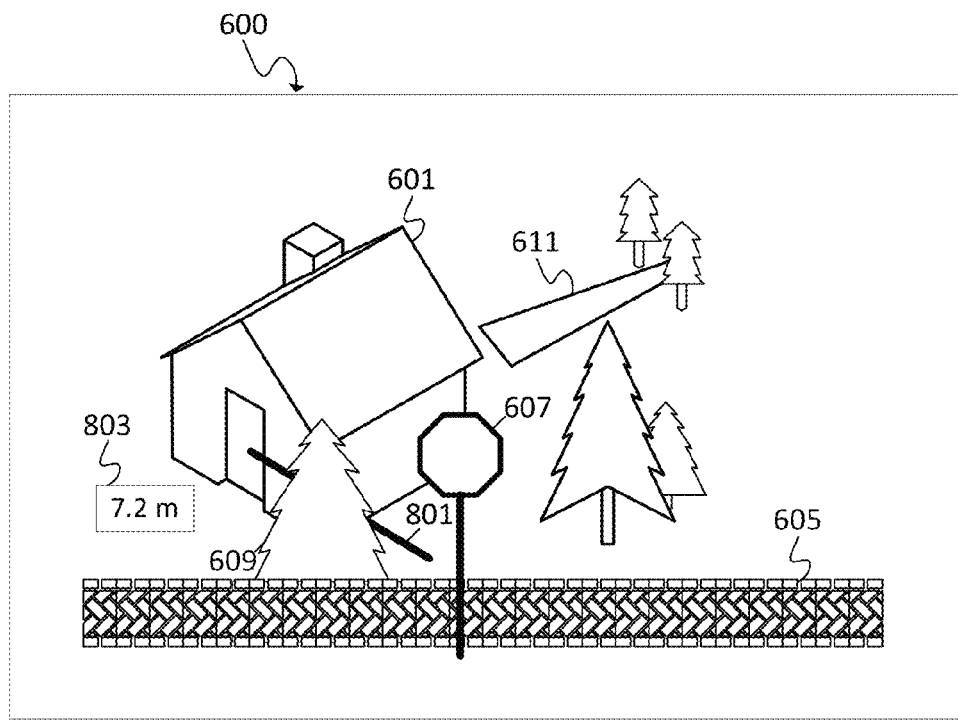
FIG. 11 illustrates placement of a measurement illustration.

FIG. 11 illustrates placement of a measurement illustration. The measurement illustration may include a depth line 801 and/or a distance indicator 803. The measurement illustration may be drawn based on two selections in the image 600. Both of the two selections may be selected using any of the implementations discussed above. Either the user device 100 or the server 120 determines the depth line 801 in 3D space between the first of the selection (user selection) in the image and the second of the selection (reference selection) in the image. Alternatively, the reference selection may be a predetermined reference point that is selected either by the user or the system 150. The predetermined reference point may be the deepest point in the image 600, the nearest point in the image 600, an average of all the depthmap points, or any configurable point in the image or depthmap.

Either the user device 100 or the server 120 determines the depth line 801 by calculating the depth line 801 from the user selection of the location and the reference location using the depthmap. The depth line 801 is drawn on the image 600 but calculated using the depthmap. The depth line 801 is in a 3D space and each point on the depth line 801 is not necessarily located in the depth map. The depth values for points in the line are compared to depth data correlated with corresponding pixels of the image. The user device 100 or the server 120 changes pixels in the image that are closer to the view of the image 600 than the calculated depth line 801 to a predetermined value. The predetermined value is a pixel value to draw the depth line 801. In some examples, portions of the depth line 801 appears behind objects in the image 600 (e.g., tree 609) that are closer to the foreground than both the user selection and the reference location, and in other examples, the depth line 801 appears behind other objects in the image 600 according to the calculations above.

The user device 100 or the server 120 calculates the distance of the depth line 801 between the user selection and the reference location. The distance may be displayed in distance indicator 803. The magnitude shown in the distance indicator 803 may indicate to the user whether the user selection is the intended selection. For example, if the user inadvertently selected the ground or the sky, the distance in the distance indicator 803 may be much too high, much too low, or invalid.

Figure 12A:
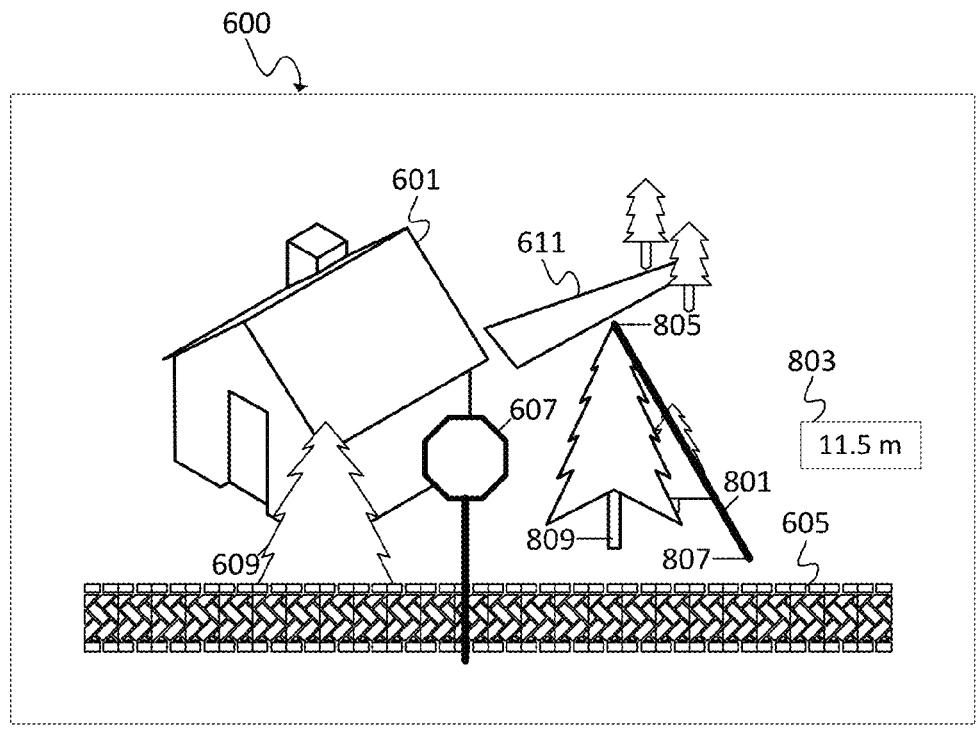
FIGS. 12A and 12B illustrate adjacent placements of a measurement illustration.
Figure 12B:
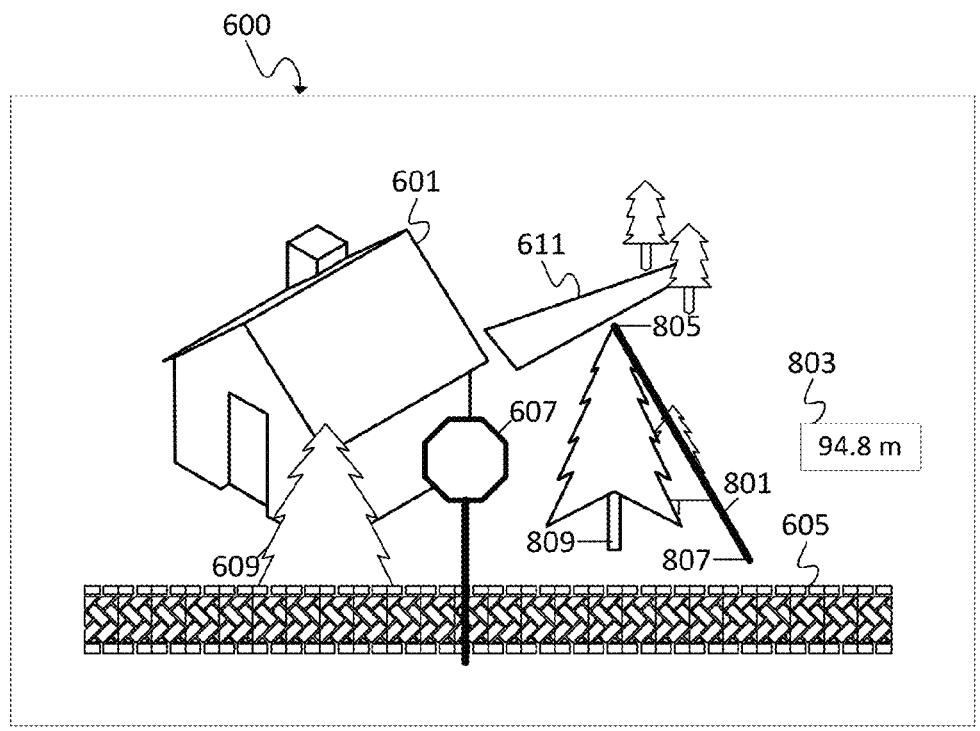

FIGS. 12A and 12B illustrate adjacent placements of a measurement illustration as depth line 801 extending from the first selection 805 to the second selection 807. The depth line 801 in FIG. 12A may be indistinguishable graphically from the depth line 801 in FIG. 12B. However, in FIG. 12A the first selection 805 is associated with the top of tree 809, while in FIG. 12B the first selection 805 is associated with the ground behind the top of tree 809. As indicated by the depth indicator 803, the length of depth line 801 in the FIG. 12A from the foreground at the second selection 807 to the top of the tree 809 is substantially lower than the length of the depth line 801 in FIG. 12B from the foreground at the second selection 807 to the ground behind the tree 809. If the depthmap and the image 600 are not precisely aligned, the greater distance in FIG. 12B may also indicate that the first selection is associated with the road 611. The distance indicator 803 allows the user visual feedback as a check on the accuracy of the first selection 805.

Figure 13:
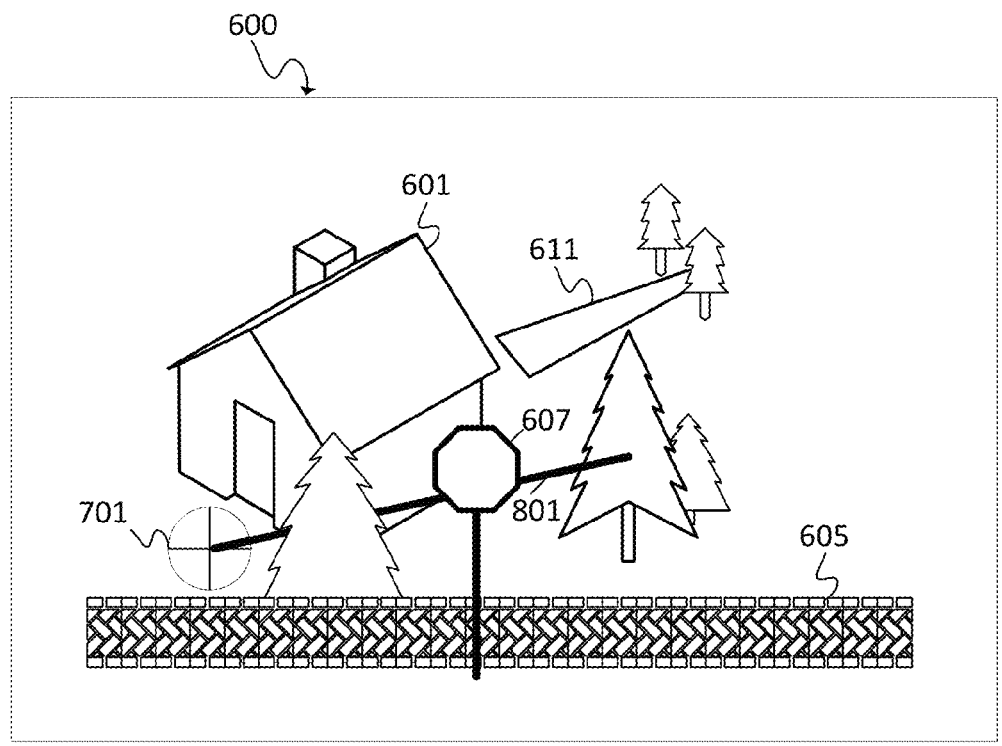
FIG. 13 illustrates a combination of a measurement illustration and a depth cursor.
Figure 14:
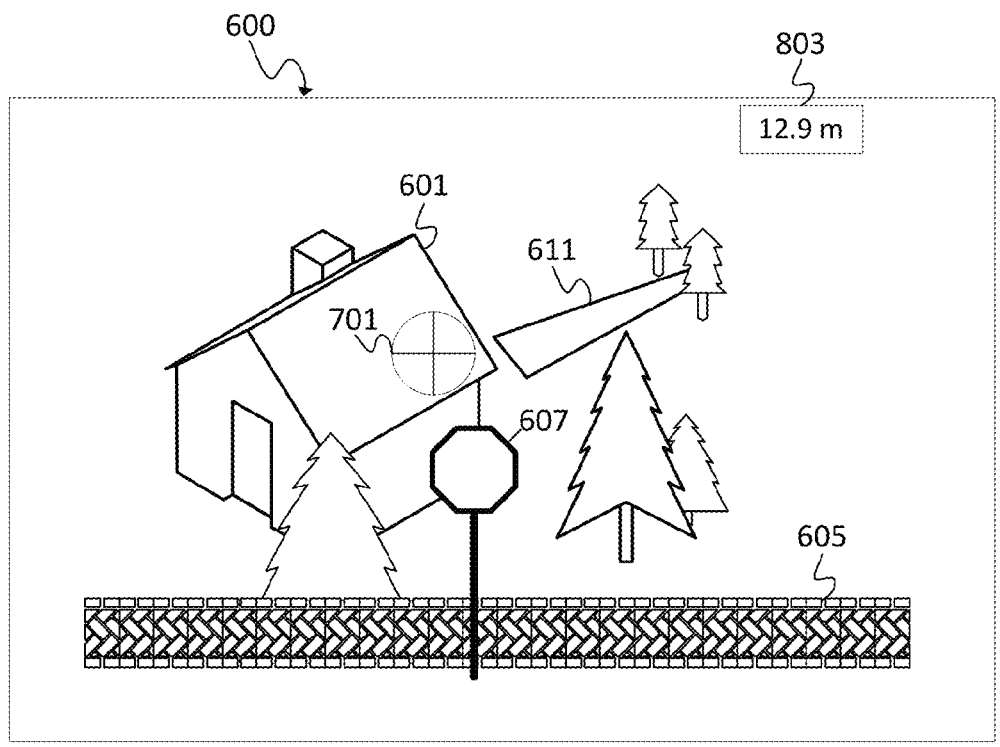
FIG. 14 illustrates another implementation of a measurement illustration and a depth cursor.

FIG. 13 illustrates a combination of a measurement illustration and a depth cursor 701. The depth cursor 701 may be used to pinpoint and select the depth line 801. That is, the depth cursor 701 may be used to select the first selection 805 and the second selection 807 that define the depth line 801. In addition, FIG. 14 illustrates another implementation of a measurement illustration and a depth cursor 701. In FIG. 14, the distance from the depth cursor 701 to a reference point is calculated by the user device 100 or the server 120 and displayed in depth indicator 803. Any or all of the algorithms and features discussed with previous implementations may be applied to the implementations of FIGS. 13 and 14.

Figure 15:
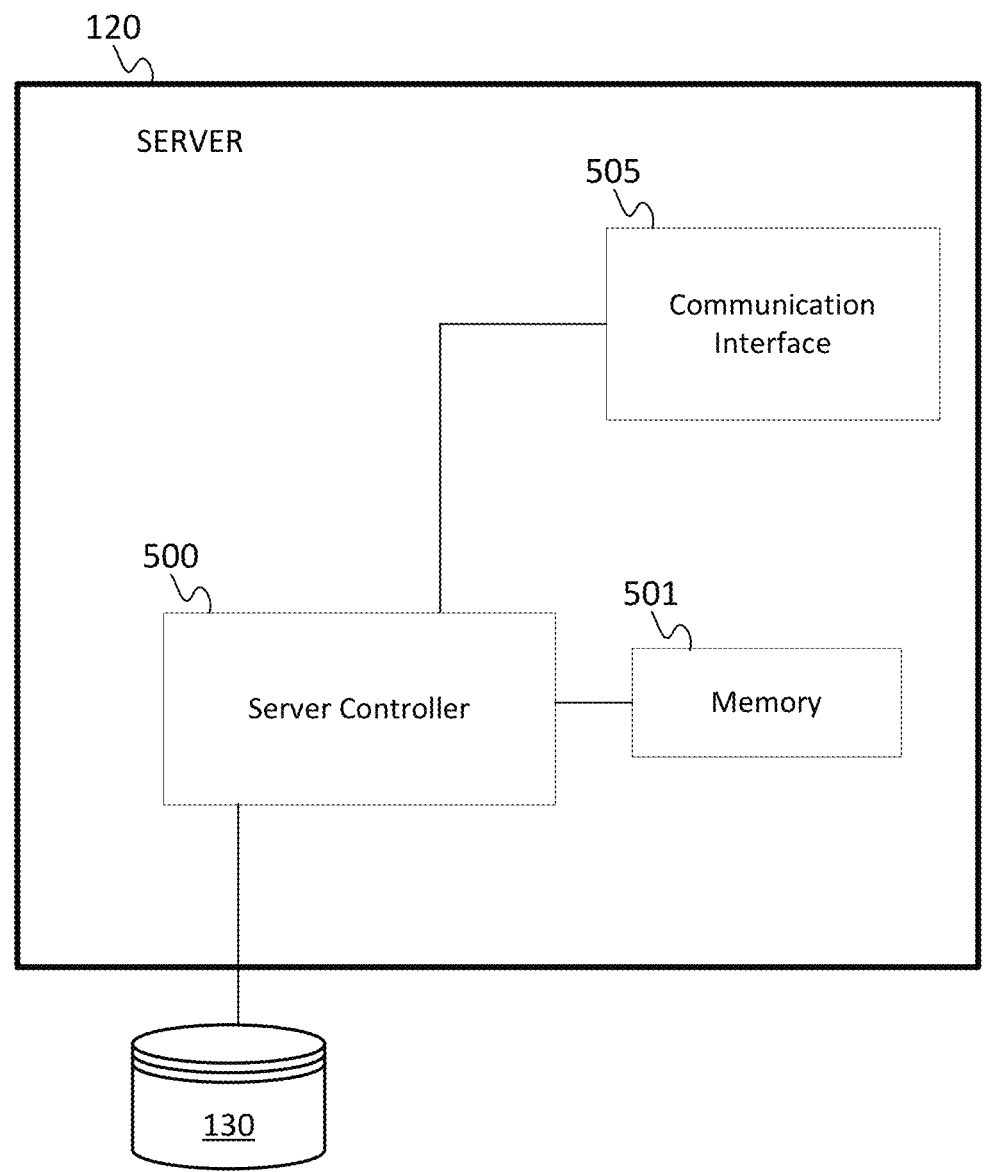
FIG. 15 illustrates a detailed view of the server of FIG. 1.
Figure 16:
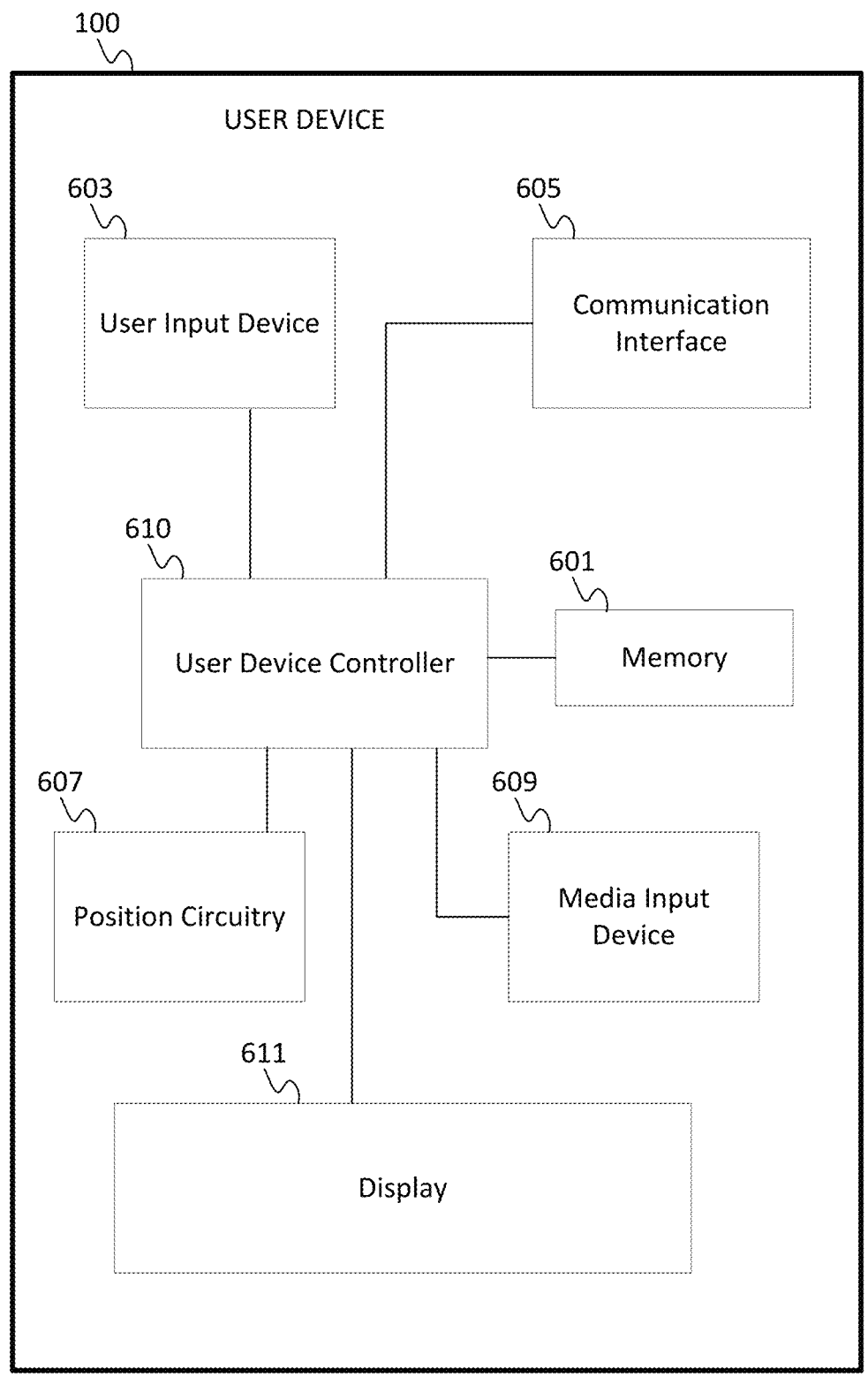
FIG. 16 illustrates a detailed view of the user device of FIG. 1.

FIG. 15 illustrates a detailed view of the server 120 of FIG. 1. The server 120 includes a server controller 500, a memory 501, and a communication interface 505. The database 130 may be external or internal to the server 120. In the server-based embodiments, the server 120 is an apparatus for providing depth feedback in a panoramic image. FIG. 16 illustrates a detailed view of user device 100 of FIG. 1. In the user device-based embodiments, the user device 100 is an apparatus for providing for depth feedback in a panoramic image. The user device 100 includes a user device controller 610, a memory 601, a communication interface 605, and position circuitry 607. The user device 100 may also include a user input device 603, a media input device 609, and a display 611.

As discussed above, the apparatus for providing depth feedback in a panoramic image may operate with or without position data for the current location of the user device 100. When the position data is used in the server-based embodiments, the position circuitry 607 determines a current geographic position of the user device 100 and the communication interface 605 sends the current geographic position to the server 120. When the position data is used in the user-device based embodiments, the position circuitry 607 determines location data including the position and/or the orientation of the user device 100. The location data may be generated using one or more of a global navigation satellite system based on a satellite signal (such as Global Positioning System (GPS), the Russian GLONASS or European Galileo), a triangulation system that utilizes one or more terrestrial communication signals, a inertial position system based on relative position sensors such as gyroscopes, accelerometers, and altimeters, and/or a or dead reckoning system based on a previously known position. The orientation may be determined using any of the above systems and/or a magnetic sensor such as a compass or a three dimensional magnetic sensor array. Magnetic sensors determine the direction and or strength of a magnetic field and can be used to determine heading or orientation. Inertial sensors such as accelerometers and gyroscopes measure acceleration, which can be used to calculate position, orientation, and velocity (direction and speed of movement) of the user device 100. The location and/or orientation data may be used to select the depthmap 500 and the panoramic image 200 from the database 130.

In the server-based embodiments the memory 501 stores the depthmap generated from the optical distancing system and the panoramic image 200. The server controller 500 is a processor configured to receive a selected location on the panoramic image 200. The selected location may be selected directly by the user on the image 600, selected indirectly by the user through map application or navigation application, or automatically selected by the server controller 500. The server controller 500 is configured to overlay the depthmap on the panoramic image according to a depthmap generated from the optical distancing system 350. The depthmap includes depth data for each of the plurality of pixels, which may be all or fewer of the pixels of the image 600 and the plurality of pixels may be grouped in grids as discussed with respect to FIGS. 4A and 4B.

The server controller 500 receives the selected location on the image 600 and replaces a subset of the plurality of pixels correlated to depth data farther from a viewer perspective than the depth data correlated with the selected location with a predetermined value. The viewer perspective may be a hypothetical position at the foreground of the image 600 or may be the position of the optical distancing system 350 when the depth data was collected.

The predetermined value may be a pixel value that represents a specific shade or color. The predetermined value may be a value from 0 to 255 or use another scale. The predetermined value may be determined from the original pixel value (i.e., the server controller 500 may replace the subset of the plurality of pixels with a predetermined value by adding or subtracting a quantity from the original pixel value).

As the server controller 500 replaces pixels, the depth illustration as the depth cursor 701 is drawn in the image 600 in front of, behind, or overlapping the selected location. Alternatively, a measurement illustration such as depth line 801 may be drawn in the image 600 between the user selection and a reference selection. Further, the server controller 500 may calculate a distance between the user selection and the reference selection. The server controller 500 may transmit data indicative of the distance to the user device 100 for display to the user.

In the user device-based embodiments, the memory 601 is configured to store the depthmap overlaid on or correlated with the panoramic image. The depthmap is generated from the optical distancing system 350 and includes depth data for each of the plurality of pixels. The user device controller 610 is configured to receive a selected location. The selected location may be received from the server 120 as part of a selection in a navigation application or a map application. Alternatively, the selected location may be selected by picking a point in the image 600 on the display 611, which may be selected using user input device 603.

The user device controller 610 is configured to compare one or more depth values correlated with pixels of a subset of the image 600 with a depth value correlated with the selected location. Each pixel of the subset of image 600 having a depth value farther than the depth value of the selected location is replaced with a predetermined value. The predetermined value represents a color or a shift in color that draws the depth illustration. Pixels of the subset of the image 600 that should appear closer than the depth illustration are not changed.

The depth illustration may be a depth cursor 701 that is repeatedly redrawn as the selected location are moved or repeated selected within the panoramic image using the user input device 603. The user input device 603 includes one or more buttons, keypad, keyboard, mouse, stylist pen, trackball, rocker switch, touch pad, voice recognition circuit, or other device or component for inputting data to the user device 100. The user input device 603 and the display 611 may be combined as a touch screen, which may be capacitive or resistive. The display 611 may be a liquid crystal display (LCD) panel, light emitting diode (LED) screen, thin film transistor screen, or another type of display.

The user device controller 610 or server controller 500 may include a general processor, digital signal processor, an application specific integrated circuit (ASIC), field programmable gate array, analog circuit, digital circuit, combinations thereof, or other now known or later developed processor. The user device controller 610 or server controller 500 may be a single device or combinations of devices, such as associated with a network, distributed processing, or cloud computing.

The memories 501, 601 may be a volatile memory or a non-volatile memory. The memory 501, 601 may include one or more of a read only memory (ROM), random access memory (RAM), a flash memory, an electronic erasable program read only memory (EEPROM), or other type of memory. The memory 501, 601 may be removable from the user device 100, such as a secure digital (SD) memory card.

The communication interfaces 505, 605 may include any operable connection. An operable connection may be one in which signals, physical communications, and/or logical communications may be sent and/or received. An operable connection may include a physical interface, an electrical interface, and/or a data interface. The communication interfaces 505, 605 provides for wireless and/or wired communications in any now known or later developed format.

In an alternative embodiment, the user device 100 may omit the position circuitry 607 or use of the position circuitry 607. In this alternative embodiment, the user device 100 may be a personal computer, which encompasses laptops and other mobile processing platforms.

Figure 17:
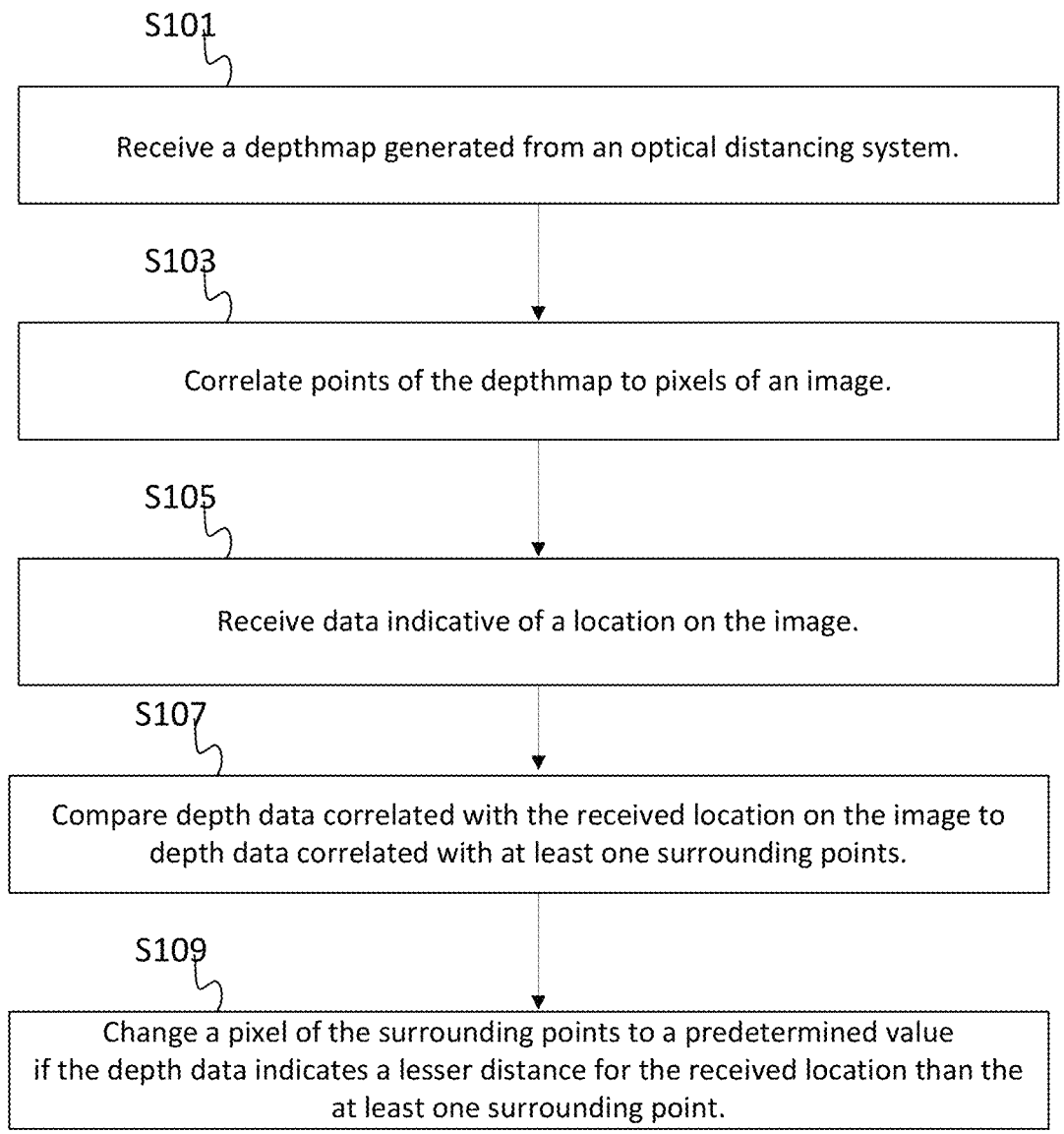
FIG. 17 illustrates a flowchart for providing depth feedback in an image.

FIG. 17 illustrates a flowchart for an algorithm for illustrating depth in an image, which may include providing a depth feedback or a visual cue within the image. As discussed above, the algorithm may be performed with or without using the user's current location and may be performed on the user device 100, the server 120, or a combination of the two. A processor (e.g., server controller 500 or user device controller 610) generally performs the steps in the algorithm. Fewer, more, or different steps or acts may be provided, and a combination of steps may be provided. Also, the steps or acts may be performed in the order as shown or in a different order. The method is implemented by the system and/or devices described herein or by different devices or systems.

At S101, the processor receives a depthmap generated from the optical distancing system 350. The depthmap was generated from collected optical distance data in the physical world and describes distances to objects in the physical world from the optical distancing system 350 and the time of collection. The distances may be measured by time of flight (laser, infrared), structured light, or a stereoscopic camera.

At S103, the processor correlates points on the depthmap to pixels of an image. The image may be part of a map database including one or more of street level images or high-altitude level maps. The panoramic image may be several photographs stitched together or may include a single photograph. If the panoramic image and the optical distance data were taken from similar locations and orientation, the correlation of the points may involve combining the depth values of the depth map with the two-component data of the panoramic image, resulting in three-component data at each point. If the panoramic image and the optical distance may were collected from difference locations and/or orientations geometric calculations are used to align the depthmap and the panoramic image.

At S105, the processor receives data indicative of a location on the image. The data may be data received from the user input device 603, which may be a touch screen or a display. The data may be received from a map application or a navigation application. Alternatively, the data may be based on a user input. The location may correspond to an object in the image. The object may be a destination, such as a road, a name on a sign, or a building or another point of interest. The selected location is associated with pixels in the panoramic image and accordingly, associated with the depth data in the depthmap correlated with the image.

At S107, the processor compares the depth data that is associated with the received location to depth data of surrounding points. Some of the surrounding points are redrawn as a depth illustration. At S109, the processor changes the surrounding points to a predetermined value for each of the surrounding points associated with a depth value that indicates a lesser distance from a viewer perspective of the image than the second depth datum. Changing some of the surrounding points to the predetermined value causes a depth illustration such as depth cursor 701 or depth line 801 to appear in the image 600. The depth cursor may be any shape drawn in a depth plane (or about the depth plane) in the image 600 based on the received location in the image. The depth line 801 is a line of pixels having the predetermined value that extends from the received location in the image. Both the depth cursor 701 and depth line 801 may appear behind certain object in the image 600. In one alternative implementation, the comparison at S107 extends to all pixels in the image 600. In other words, the surrounding points include all points in the image 600.

The depth cursor may be moved around the panoramic image 200. The movement may be controller by user device 100 via the user input device 603. As the depth cursor moves, the depth value of each new pixel it encounters is compared to the depth of the depth cursor. Some objects in the panoramic image may have uneven surfaces such that adjacent series of pixels fluctuate between similar depth values. Also, variance in the depth values may be a natural result of the data collection of the optical distancing system 350.

Therefore, in some situations the depth cursor may appear to flash as the depth cursor moves quickly in front of or behind objects in the panoramic image 200. To minimize this occurrence, the processor may introduce a hysteresis curve into the comparison at S107. For example, the processor may compare the depth data of surrounding points to the depth data that is associated with the received location plus and/or minus a hysteresis buffer. Accordingly, the depth cursor only switches from in front of an object to behind an object or vice versa if the change in depth of the objects exceeds a predetermined amount, which may be referred to as the hysteresis buffer. The hysteresis buffer may be measured in a depth value (e.g., 1, 5, or 10 units on the 255 range). The hysteresis buffer may be dependent on the range of depth values in the image. For example, the hysteresis buffer (h) may be set to $h=(d_{max}-d_{min})*S$, where $d_{max}$ is the largest depth value in the image, $d_{min}$, is the smallest depth value in the image, and S is the percentage of the hysteresis buffer (e.g., 1%, 5%, 10%). Alternatively, the hysteresis buffer may be a time buffer (e.g., 100 milliseconds, 2 seconds) in which a change in depth of the depth cursor are delayed when the change exceeds a threshold amount.

The embodiments described above may be combined with systems and methods for emphasizing objects in images as described in copending application "REIMAGING BASED ON DEPTHMAP INFORMATION" by James D. Lynch, filed Oct. 21, 2011, Ser. No. 13/278,499, which is incorporated by reference in its entirety. The embodiments described above may be combined with systems and methods for illustrating routes in panoramic or other images as described in copending application "THREE DIMENSIONAL ROUTING" by James D. Lynch, filed Oct. 21, 2011, Ser. No. 13/278,546, which is incorporated by reference in its entirety.

The embodiments described above may be implemented using computer executable instructions stored in the memory 501 and/or the memory 601, which are non-transitory. The processors may execute computer executable instructions. The computer executable instructions may be written in any computer language, such as C++, C#, Java, Pascal, Visual Basic, Perl, HyperText Markup Language (HTML), JavaScript, assembly language, extensible markup language (XML), graphics languages such as WebGL and OpenGL, and shading languages such as OpenGL Shading Language (GLSL) and High Level Shading Language (HLSL), and any combination thereof.

The computer executable instructions may be logic encoded in one or more tangible media or one or more non-transitory tangible media for execution by the processors. Logic encoded in one or more tangible media for execution may be defined as instructions that are executable by the processors and that are provided on the computer-readable storage media, memories, or a combination thereof. Instructions for instructing a network device may be stored on any logic. As used herein, "logic", includes but is not limited to hardware, firmware, software in execution on a machine, and/or combinations of each to perform a function(s) or an action(s), and/or to cause a function or action from another logic, method, and/or system. Logic may include, for example, a software controlled microprocessor, an ASIC, an analog circuit, a digital circuit, a programmed logic device, and a memory device containing instructions.

The computer readable instructions may be stored on any non-transitory computer readable medium. A non-transitory computer readable medium may include, but are not limited to, a floppy disk, a hard disk, an ASIC, a compact disk, other optical medium, a random access memory (RAM), a read only memory (ROM), a memory chip or card, a memory stick, and other media from which a computer, a processor or other electronic device can read.

As used herein, the phrases "in communication" and "couple" are defined to mean directly connected to or indirectly connected through one or more intermediate components. Such intermediate components may include both hardware and software based components.

Various embodiments described herein can be used alone or in combination with one another. The foregoing detailed description has described only a few of the many possible implementations of the present invention. It is intended that the foregoing detailed description be regarded as illustrative rather than limiting and that it is understood that the following claims including all equivalents are intended to define the scope of the invention.

I claim:

1. A method for illustrating depth in an image, the method comprising:
    receiving a depthmap generated from an optical distancing system, wherein the depthmap is correlated with a plurality of pixels of the image;
    receiving, at a controller, data indicative of a location on the image and indicative of a first depth datum of the depthmap corresponding to a first physical object in the image;
    comparing, with the controller, the first depth datum to a second depth datum correlated with at least one of a plurality of surrounding points and a second physical object in the image;
    if the first depth datum indicates a lesser distance from a viewer perspective of the image than the second depth datum, changing a pixel of the at least one of the plurality of surrounding points to a predetermined value;
    wherein the predetermined value of the pixel corresponds to a virtual depth cursor indicative of a selection in the image, and
    if the first depth datum indicates a greater distance from the viewer perspective of the image than the second depth datum, maintaining the pixel of the at least one of the plurality of surrounding points unchanged.

2. The method of claim 1, further comprising:
    displaying the depth cursor on the image, wherein the depth cursor comprises an indicium to indicate the location.

3. The method of claim 2, wherein receiving data indicative of a location on the image comprises receiving a user selection of the location on the image, wherein the indicium indicates the user selection.

4. The method of claim 1, wherein the predetermined value of the pixels corresponds to a depth measurement graphic.

5. The method of claim 4, wherein receiving data indicative of the location on the image comprises receiving a user selection of the location on the image and a reference location on the image.

6. The method of claim 5, further comprising:
    calculating a line from the user selection of the location and the reference location using the depthmap;
    comparing depth values for points in the line to depth data correlated with corresponding pixels of the image;
    changing the corresponding pixels of the image to a predetermined value, when the line corresponds to a depth closer to a viewer perspective of the image than the corresponding pixels of the image.

7. The method of claim 1, wherein each of the plurality of points comprises two-dimensional position data.

8. The method of claim 1, wherein the optical distancing system is a light detection and ranging (LIDAR) system.

9. The method of claim 1, wherein the optical distancing system emits structured infrared light.

10. The method of claim 1, wherein when the first depth datum indicates the greater distance from the viewer perspective of the image than the second depth datum, the virtual depth cursor is between the first physical object and the second physical object.

11. An apparatus for depth feedback in an image including a plurality of pixels, the apparatus comprising:
    a memory configured to store a depthmap overlaid on the image, wherein the depthmap is generated from an optical distancing system and includes depth data for each of the plurality of pixels; and
    a processor configured to receive a selected location on the image and replace a subset of the plurality of pixels with a predetermined value if the subset of the plurality of pixels is correlated to depth data farther from a viewer perspective than the depth data correlated with the selected location,
    wherein the subset of the plurality of pixels represents a virtual depth cursor drawn in front of the selected location in the image.

12. The apparatus of claim 11, wherein the processor is configured to repeatedly redraw the depth cursor as the depth cursor and selected location are moved or successively selected within the image.

13. The apparatus of claim 11, wherein the subset of the plurality of pixels corresponds to a measurement illustration between the user selection and a reference selection.

14. The apparatus of claim 13, wherein the processor is configured to calculate a distance between the user selection and the reference selection.

15. The apparatus of claim 11, wherein the optical distancing system is a light detection and ranging (LIDAR) system or a system that emits structured infrared light.

16. A non-transitory computer readable medium having stored thereon a computer program configured to provide a visual cue of depth in a panoramic image, the program comprising instructions to:
    receive a depthmap generated from an optical distancing system, wherein the depthmap includes depth data for each of a plurality of points and is overlaid on the panoramic image according to the plurality of points;
    receive data indicative of a location on the panoramic image and a first point of the plurality of points;
    calculate a comparison of a first depth datum correlated with the first point to a second depth datum correlated with at least one of a plurality of surrounding points; and alter the panoramic image to a virtual depth cursor at the at least one of the surrounding points based on the first depth datum.

17. The non-transitory computer readable medium of claim 16, wherein the panoramic image is altered to include the virtual depth cursor at a depth plane in the panoramic image based on the first point.

18. The non-transitory computer readable medium of claim 16, wherein the panoramic image is altered to include a depth measurement line from the location in the panoramic image to a reference location.

19. The non-transitory computer readable medium of claim 16, wherein the optical distancing system is a light detection and ranging (LIDAR) system or a system that emits structured infrared light.

* * * * *